(12) United States Patent
Koh

(10) Patent No.: US 10,262,554 B2
(45) Date of Patent: Apr. 16, 2019

(54) METHOD OF LEARNING ENGLISH USING TEACHING ENGLISH WORD ORDER MAP AND SYSTEM FOR LEARNING ENGLISH USING THE SAME

(71) Applicant: Kwang Chul Koh, Guri-si (KR)

(72) Inventor: Kwang Chul Koh, Guri-si (KR)

( * ) Notice: Subject to any disclaimer, the term of this patent is extended or adjusted under 35 U.S.C. 154(b) by 345 days.

(21) Appl. No.: 15/303,786

(22) PCT Filed: May 11, 2015

(86) PCT No.: PCT/KR2015/004694
§ 371 (c)(1),
(2) Date: Oct. 17, 2016

(87) PCT Pub. No.: WO2015/170945
PCT Pub. Date: Nov. 12, 2015

(65) Prior Publication Data
US 2017/0046981 A1     Feb. 16, 2017

(30) Foreign Application Priority Data

May 9, 2014   (KR) ......................... 10-2014-0055669

(51) Int. Cl.
*G09B 19/06* (2006.01)
*G09B 5/06* (2006.01)

(52) U.S. Cl.
CPC ............... *G09B 19/06* (2013.01); *G09B 5/06* (2013.01)

(58) Field of Classification Search
None
See application file for complete search history.

(56) References Cited

FOREIGN PATENT DOCUMENTS

| KR | 10-2007-0065859 A | 6/2007 |
| KR | 10-2009-0102726 A | 9/2009 |
| KR | 10-2011-0026630 A | 3/2011 |
| KR | 10-2013-0046491 A | 5/2013 |

OTHER PUBLICATIONS

Search Report for International Application No. PCT/KR2015/004694.

*Primary Examiner* — Paul A D'Agostino
(74) *Attorney, Agent, or Firm* — LRK Patent Law Firm

(57) ABSTRACT

A method of learning English using teaching English word order has the features of dividing a sentence input by a learner into a main subject, a main event including an action and an object, and an auxiliary condition including an auxiliary condition and a criterion thereof; and classifying and displaying a part representing the main subject as a Step 1 sentence segment, a part representing the action as a Step 2 sentence segment, a part representing the object as a Step 3 sentence segment, a part representing the auxiliary condition as a Step 4 sentence segment and a part representing the criterion of the auxiliary condition as a Step 5 sentence segment. The words forming the Step 1 to the Step 5 sentence segments comply with a part of speech criterion assigned for each sentence segment.

18 Claims, 22 Drawing Sheets

She read a book in the room

She read a book in the room

FIG. 35

|  |  |  | withered. |
|---|---|---|---|
|  | who | had | his | hand | [2] |
| There | was | a man | ■ | [2] | ○―[3] |
| ○ | [2]→○ [1] | | |

FIG. 36

|  |  |  |  | of sins |
|---|---|---|---|---|
|  | and |  | for forgiveness | [4][5] |
|  | baptizing in the wildness | ■ | preaching the baptisim of repentance | [4] | [5] |
| John | came | [3] | [4]○―[5] | [3] | [3] | [4] | [5] |
| [1] | [2] | | | | | | |

FIG. 37

|  |  |  |
|---|---|---|
| When they had come out of the synagogue, |  | ← Second Level |
| ■ [1] ○―[2] ○[4]○―[5] | they came into the house. | ← First Level |
|  | [1] [2] [4] ○―[5] | |

METHOD OF LEARNING ENGLISH USING TEACHING ENGLISH WORD ORDER MAP AND SYSTEM FOR LEARNING ENGLISH USING THE SAME

BACKGROUND OF THE INVENTION

1. Field of the Invention

The present disclosure relates to a method of learning English using teaching English word order map, and a system therefor, and more specifically to a method of learning English using an English word order map which has improved efficiency in learning English with introduction of a new concept of sentence segment.

2. Description of Related Art

A foreign language, such as English Learning, can be learned through mainly four strategies including reading, writing, listening, and speaking. Each of the strategies requires a combination of understanding words and studying a word order in order to improve the entire language skills.

There are enormous number of words to learn, including newly generated words in addition to existing ones. In particular, a learner has to memorize a word with its sound, so learning words require great efforts and time.

On the other hand, there are already well-organized word arrangement rules and a method of utilizing the same, and thus, people can learn the arrangement rules relatively in a short time. It is because adapting the word arrangement rules is not based on memorizing capabilities against forgetting, but based on the capabilities of understanding the logical and systematic ground.

A word arrangement rule is referred to as a word order, and most of the grammar rules for making a sentence corresponds to basic word order principles.

Once a person learns and fully understands the word order principles which are the essential part of grammar, the person only needs to study more words and expressions constantly to improve language skills.

In Korea, many people start to learn grammar during elementary school years and keep studying even after graduation of high schools. Despite such long and hard efforts, most of the people are not able to determine or find out an error in an English word order. In light of this, the existing learning method seems to have many problems.

Although many grammar rules are taught, there is no outline of rules for how to arrange words. Even when how to arrange a word in the fifth sentence pattern is explained, there is no systematic explanation about a further expansion sentence. It is because there is basically a lack of understanding on a role that each function word has in an arrangement rule. For this reason, it is difficult to systemically accumulate learned grammar rules.

For example, when it comes to "to infinitives", there is no outline about when to utilize "to infinitives" and which arrangement rule is able to use in an attempt to expand a sentence. Under this background, many people depend on their memorizing capabilities rather than understanding to learn a language. If the people are able to accurately understand and adapt word arrangement rules within a short period of time, they could exhibit good enough understanding of grammar when learning new words, thereby enabled to easily understand various exemplary sentences.

Therefore, a learner is capable of making various English sentences only with a limited number of words the learner knows. In addition, the learner may obtain the basis on which reading, speaking, listening, and writing skills could improve further.

The descriptions of the background art are provided for the purpose of understanding of the background of the present disclosure, and it should not be regarded a prior art which is known to those skilled in the art.

SUMMARY OF THE INVENTION

The present disclosure aims to provide a method of learning English using an English word order map which improves efficiency in learning English by improving an English sentence capability based on spontaneous word arrangement rules, and a system therefor.

To obtain the above objective, there is provided a method of learning English using an English word order map, including: dividing a sentence input by a learner into a main event and an auxiliary situation, wherein the main event includes a main agent, an action, and an object, and the auxiliary situation includes an auxiliary condition and a criterion therefor, wherein a part representing the main agent is classified as a Step 1 sentence segment, a part representing the action is classified as a Step 2 sentence segment, a part representing the object is classified as a Step 3 sentence segment, a part representing the auxiliary condition is classified as a Step 4 sentence segment; and a part representing the criterion of the auxiliary condition is classified as a Step 5 sentence segment, and wherein a word composing each of the Step 1 to Step 5 sentence segments conforms to a part of speech that is set to each of the Step 1 to Step 5 sentence segments.

An object of question in an interrogative sentence, and an exclamatory word and an object of exclamation in an exclamatory sentence may be positioned in a Step 0 sentence segment, wherein the object of question corresponds to existence, behavior, thought, experience, and 5W1H.

The Step 1 to Step 5 sentence segments may be distinguished in the sentence by sentence segment distinguishing lines, a basic sentence and an expansion sentence are displayed at different height when the sentence may be expanded, the expansion sentence may be distinguished by a sentence expansion distinguishing line, one sentence including the basic sentence and the expansion sentence may be displayed as one unit by a sentence distinguishing line, a sentence segment sequence symbol may be displayed at a location of a main word of a sentence segment to indicate a sequence of the sentence segment, a word other than the main word may be indicated by a simple symbol, a relationship between the symbol symbol and the sentence segment sequence symbol may be indicated by a modification relationship symbol, and a location of a particular word may be indicated by a navigator.

Words sequentially arranged in the sentence may be displayed by sequentially connecting image cards, wherein a word included in the sentence is shown on a front surface of an image card, and a meaning of the word is shown on a back surface thereof, and a word having a different sentence level may be placed at different height.

The navigator may provide guidance about a current sentence segment of a current step, anticipate a next sentence segment, provide a guide as to whether a current sentence segment corresponds to a main situation or an auxiliary situation in a sentence, and provide guidance that a modifying sentence is able to follow each of the Step 1 sentence segment, the Step 2 sentence segment, and the Step 5 sentence segment, and the navigator may include a sentence segment guide item configured to notify whether sentence expansion has started and then provide a guide to a new sentence segment step when the sentence expansion is done, a sentence knot guide item configured to, upon the sentence expansion, display front and back sentences in a connected form and indicate a semantic subject of an expansion sentence, a modification and auxiliary relationship guide item configured to, in response to appearance of a simple symbol, anticipate that a main word corresponding to a sentence segment sequence symbol follows, a part-of-speech change guide item configured to, in response to change of a part of speech with respect to a main word of a sentence segment, guide a meaning of the main word, and a sentence connection guide item configured to, in response to connection of two or more words or sentences, guide a meaning of the connection.

The part of speech conforming to the Step 0 to Step 5 sentence segments may comply with the following rules.

i) a declarative sentence: a Step 1 sentence segment (noun), a Step 2 sentence segment (verb, verb+adjective), a Step 3 sentence segment (noun, noun+noun), a Step 4 sentence segment (preposition), and a Step 5 sentence segment (noun).

ii) an imperative sentence: a Step 1 sentence segment (noun), a Step 2 sentence segment (verb, verb+adjective), a Step 3 sentence segment (noun, noun+noun), a Step 4 sentence segment (preposition), and a Step 5 sentence segment (noun).

iii) an interrogative sentence: a Step 0 sentence segment (question word, auxiliary verb), a Step 1 sentence segment (noun), a Step 2 sentence segment (verb, verb+adjective), a Step 3 sentence segment (noun, noun+noun), a Step 4 sentence segment (preposition), and a Step 5 sentence segment (noun).

iv) an exclamatory sentence: a Step 0 sentence segment (exclamatory word+a/an+adjective, noun or exclamatory word+adjective/adverb), a Step 1 sentence segment (noun), a Step 2 sentence segment (verb, verb+adjective).

The Step 1 to Step 5 sentence segments may be expanded in a manner in which a word or sentence modifying a main word is further displayed in each sentence segment, wherein nouns included in the Step 1, Step 3, and Step 5 sentence segments, a verb included in the Step 2 sentence segment, and a preposition included in the Step 4 sentence segment are used as a main word.

When a noun is a main word, a sentence segment may be expanded in compliance with one of the following rules, the modifying sentence in the rule ii) may be in a form of a conjunctive function word+a modifying sentence, a verb-omitted sentence (preposition+noun, adjective), and or a verbial adjective (to+verb, verb+ing, verb+~ed), and a sentence inserted under the rule iii) may be in a form of a conjunction+a sentence, a question word+to verb, or a verbial noun (to+verb, verb+ing).

i) a determiner/adjective/noun+a noun (main word)
  ii) a noun (main word)+a modifying sentence
  iii) a full sentence inserted into a position of a noun (main word)

When a verb is a main word, a sentence segment may be expanded in compliance with one of the following rules.

i) an auxiliary verb (a helping verb)+a verb
  ii) an auxiliary verb (have, be)+a verbial adjective (a current participle, a past participle)
  iii) a link/sense verb+an adjective To solve the above problems, there is provided a system for learning English using an English word order map, the system including: a sentence input unit configured to act as an interface to receive a sentence from a user; a sentence classifier provided in a control part and configured to divide the sentence input to the sentence input unit into a main event, which includes a main agent, an action, and a target, and an auxiliary situation which includes an auxiliary condition and a criterion of the auxiliary condition, and classify a part representing the main agent as a Step 1 sentence segment; classify a part representing the action as a Step 2 sentence segment, a part representing the target as a Step 3 sentence segment, classify a part representing the auxiliary condition as a Step 4 sentence segment, classify the criterion of the auxiliary condition as a Step 5 sentence segment, and classify an object of question in an interrogative sentence and an exclamatory word and an object of exclamation as a Step 0 sentence segment, wherein the object of question corresponds to existence, behavior, thought, experience, or 5W1H, and wherein the classification is performed in consideration of a part of speech set to each of the sentence segments; a symbol determination unit provided in the control part and configured to determine a classification indicator and a modification relation indicator for a word included in each of the Step 0 to Step 5 sentence segment; and an English word order map generator provided in the control part and configured to generate an English word order map by assigning a symbol determined by the symbol determination unit to a word included in each of the Step 0 to Step 5 sentence segments.

The symbol determination unit may store a sentence segment distinguishing lines configured to distinguish each of the Step 0 to Step 5 sentences segments; a sentence level distinguishing line configured to display a basic sentence and an expansion sentence at different height, wherein the basic sentence and the expansion sentence modifying the basic sentence are included in one sentence; a sequence symbol configured to indicate that a word included in a sentence is a word composing any one of the Step 0 to Step 5 sentence segments; a simple symbol configured to indicate a word other than the main word; a modification relation line configured to indicate a relationship between the simple symbol and the sequence symbol; and a manigator configured to indicate a location of a word included in a sentence.

A module generation unit is further included, which is provided in the control part and configured to change the English word order map, generated by the English word order map generation unit, according to a learner's study method, and store the changed English word order map.

The module generation unit may be configured to generate and store a sentence reading module, the sentence reading module may be configured to include a content storage unit configured to store English sentence content to be learn on the basis of a content item unit; an English word order situation guide unit configured to provide a word order situation of a word selected by a learner from the English word order map; an English word order storage unit configured to receive data from the English word order map generation unit and store the received data; and and a menu bar, wherein the English word order situation guide unit provides a word order situation prior to a word displayed at a current location, a word order situation at the current location, and an anticipated next word order situation, and wherein the English word order situation guide unit further includes a display unit configured to display the menu bar and display, on an additional window, content stored in the content storage unit, the English word order situation guide unit, and the English word order map storage unit.

The sentence reading module may further include a mode conversion unit which receives the English word order map from the English word order map storage unit, and converts the received English word order map into a roll up mode, a cover up mode, and a sentence segment searching mode, the roll up mode may be implemented to enable a leaner to sequentially open each word at once from a hidden English word order map, the cover up mode may be implemented to enable the learner to sequentially hide each word at once from an open English word order map, and the sentence segment searching mode may be implemented such that sentence segments of a sentence, to which sentence levels have not yet to be set, necessary for the English word order map are displayed differently according to sentence levels.

The module generation unit may generate and store a sentence learning module, the sentence learning module may be configured to include a content storage configured to store English sentence content to be learned on the basis of a content item unit, a content implementation unit configured to store a sentence desired by a learner to learn and audio sound of the sentence, an English word order map storage configured to receive data from the English word order map generator and store the received data, an English word order grammar guide unit configured to guide a grammatical situation of an English word selected by the learner from the English word order map, and a menu bar. The English word order grammar guide unit may provide descriptions about a relevant grammar rule, a relevant exemplary sentence, and a relevant question, and the English word order grammar guide unit may further include a display unit configured to display the menu bar and display, on an additional window, content stored in the content storage unit, the content implementation unit, the English word order map storage unit, and the English word order grammar guide unit.

The module generation unit may be configured to generate a sentence word order matching module, and the sentence word order matching module may include a content storage unit configured to store English sentence content to be learn on the basis of a content item unit, a word storage unit configured to store words necessary for a learner to make a word order map of a sentence, a symbol storage unit configured to receive a symbol from the symbol determiner and store the received symbol, and a menu bar. The sentence word order matching module may further include a display unit configured to display the menu bar and display, on an additional window, content stored in the content storage unit, the word storage unit, and the symbol storage unit, and an additional window is displayed on the display unit to enable the learner to make an English word order map using symbols stored in the symbol storage unit.

The module generation unit may be configured to generate and store a sentence word order matching module, and the sentence word order matching module may include a content storage unit configured to store English sentence content to be learn on the basis of a content item unit, a card storage unit configured to store an image card, on front and back surfaces of which a spelling and an image of a word selected by a learner from the English sentence content are displayed respectively, and a menu bar. The sentence word order matching module may further include a display unit configured to display the menu bar and display, on an additional window, content stored in the content storage unit, the menu bar, and the image card storage unit, and an additional window may be displayed on the display unit to enable the learner to make the English word order map using image cards stored in the image card storage unit.

The image cards may be arranged sequentially in a hexagon shape so that a word having a sentence level different from a sentence level of an adjacent word is placed at different height and connected to the adjacent word.

Advantageous Effects

Due to the above technical configuration, the present disclosure may have various effects as below.

First, it is possible to enable a learner to learn accurate grammar rules and structures of English sentences, so that the learner can accurately understanding English sentences within a short period of time.

Second, by drawing an English word orer map of an English sentence to be learned, a learner can diagnose as to whether the leaner fully understands the structure of the English sentence.

Third, based on the self diagnosis, the learner is able to determine what he/she knows and what he/she is yet to know, and therefore, self-directed learning focused on solving problems may be encouraged.

Fourth, it is possible to establish a learning system of providing grammar guide about an English sentence based on a principle of sequential generation of English word order maps.

BRIEF DESCRIPTION OF THE DRAWINGS

FIG. 35 illustrates a twenty fourth exemplary sentence.
FIG. 36 illustrates a twenty fifth exemplary sentence.
FIG. 37 illustrates a twenty sixth exemplary sentence.

DETAILED DESCRIPTION OF THE INVENTION

Figure 1:
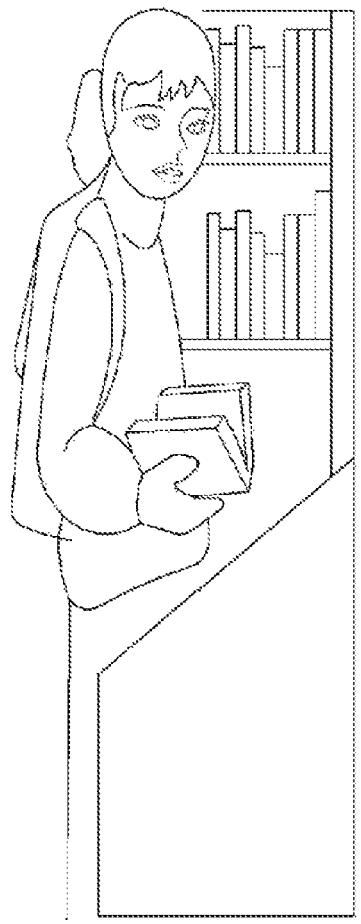
FIG. 1 is a diagram illustrating an image for explanation of spontaneous elements of a sentence and an order in which the spontaneous elements are arranged.

Hereinafter, a method of learning English with an English word order map and a system therefor are described with reference to the accompanying drawings.

The present disclosure has an objective of improving English sentence making capabilities based on spontaneous rules of arrangement of English words. To this end, the present disclosure aims to systematically suggest a method of expanding word arrangement based on basic characteristics of the spontaneous principle rules. The present disclosure suggests a system of generating and utilizing an English order map to enable a learner to obtain logical understandings.

The spontaneous rules of arrangement of English words are described in the following.

One of the biggest challenges Korean learners face lies in the difference between the English arrangement order and the Korean arrangement order.

In the case of Korean, words are arranged from the outer to the inner in consideration of semantics of a full sentence. On the other hand, in the case of English, words are arranged from the center of a subject.

It is because the way that English speakers see the nature is different from that of Korean speakers, and therefore, how to arrange what is seen is also different between English and Korean speakers.

When recognizing certain objects, Korean speakers first figure out the objects in a broad sense and then determine an arrangement order of words in a manner of explaining the relationships of the objects and a change therein. On the other hand, English speakers determine a main object to talk about, and then explain action and change related to the main object while determining an arrangement order of words in a manner of explaining the action and change.

Take an example of a Korean sentence "나는 당신을 사랑합니다." In this Korean sentence, a speaker or writer first perceives the existence of "나" and "당신" in a broad sense, and then enumerates words to describe the relationship thereof and a change therein.

On the other hand, in an English sentence "I love you", "I" is determined to be a main subject and thus comes first. Then, a change in action of the main subject follows, and an object of the change comes next.

This difference is caused because English does not have participles that Korean has to indicate a subject and a topic.

For this reason, a word order itself is used as a means for conveying a role and a meaning of each word.

That is, English needs rules for enumerating words, which are elements of a complete sentence, in order based on a spontaneous principle of arrangement.

That is, elements of a sentence (subject, complement, object, modifier, and predicate), are sequentially positioned in order, and an appropriate function for each element (part of speech: noun, pronoun, verb, adjective, adverb, preposition, conjunction, exclamatory word, etc.) is positioned. In this manner, consistent rules of arrangement of words may be hold.

A sentence is a minimum unit of language that expresses a complete thought or feeling.

To describe spontaneous elements of a sentence and an arrangement order thereof, an image shown in FIG. 1 is expressed as a sentence.

Due to the characteristics that English does not have participles indicating a subject and a topic, to express the image shown in FIG. 1 as a sentence, it is necessary to define what is a "main event" and then explain how an "auxiliary situation" is developed.

In other words, a word order is defined in a manner such that a main agent "she" is first defined, the change "reads" happens, and a book which is target of the action comes last.

Regarding an auxiliary situation of an event, an auxiliary condition is declared first and then a criterion of the auxiliary condition is mentioned. That is, a word order is defined in a manner such that an auxiliary condition, in which a main event of her reading a book has occurred, is mentioned and then a criterion of the auxiliary condition, which describes that the inside indicates inside a room, comes next.

Based on this logical ground, a key part of a sentence is defined as a main event, and a situation given with the main event is defined as an auxiliary situation.

That is, a sentence is in a structure in a basic word order of "main event+auxiliary situation", wherein the main event is described in the order of "main agent"+"action"+"target", and the auxiliary situation is described in the order of "auxiliary condition"+"criterion of auxiliary condition."

This may be shown as in the following Table 1.

TABLE 1

| Basic Spontaneous Principle of Arrangement of English Words in Sentence | | | | |
|---|---|---|---|---|
| Main Event of Sentence | | | Auxiliary Situation of Event | |
| Main agent | Action, (change in behavior/ existence) | Target of action | Auxiliary condition | Criterion for auxiliary |

To explain the basic rules of arrangement of words more systematically, the present disclosure has introduced a new concept of "sentence segment."

A sentence segment is a minimum unit of a sentence, in which elements of the sentence are positioned sequentially because English does hot have participles indicating a subject and a topic.

Sequential and phased concepts may be given to sentence segments of a sentence.

Using concepts given to the sentence segments, the spontaneous rules of arrangement of English words may be defined as in the following Table 2.

TABLE 2

| Main event of sentence | | | Auxiliary situation of sentence | |
|---|---|---|---|---|
| Step 1 sentence segment | Step 2 sentence segment | Step 3 sentence segment | Step 4 sentence segment | Step 5 sentence segment |
| Main agent | Action, (change in behavior/ existence) | Target of Action | Auxiliary condition | Criterion for auxiliary condition |
| Subjct | Predicate | Objective, Complement | Modifier | |

Hereinafter, there is described a method of arranging English words based on functions thereof according to a type of a sentence.

First, a method of arranging English words based on functions thereof in a declarative sentence is described.

As described above, in order to utilize the spontaneous rules of arrangement of English words in practice, it is necessary to consider a functional role (a part of speech) of each word.

A main agent corresponds to a subject of a sentence, so a noun which is the basic part of speech is used at a positioned of the subject.

Action (change in behavior/existence) is used to describe a change in the main agent, so a verb is used as a basic part of speech at a positioned of the action. In some cases, an adjective may be used to express a predicate through action. In such cases, "verb+adjective" may be used at the position of the action.

Verbs which are able to be used in the form of "verb+adjective" includes "be verbs", "become", "appear", "get", and "grow." In addition, such verbs may include sense verbs, such as "look", "seem", "sound", "taste", and "feel" which are related to five senses, and auxiliary verbs such as "have" which is used to act as a perfunctory verb A target of action is a particular object of the action, and thus, a noun, which is the basic part of speech for an object is positioned.

Two objects may be used as a target of action, only when an adaptive verb is used, such as "give", "tell", "show", "send", and "offer."

An auxiliary condition is used to define a time, a space, or an auxiliary condition (an objective, a reason, a result, etc) which occurs in conjunction with an action of a main agent and a target affected by the action. A preposition is used at a position of the auxiliary condition. For a criterion of the auxiliary condition, a noun is used because the auxiliary situation is expressed with a preposition.

Considering the above characteristics, a method of arranging English words based on functions (parts of speech) thereof in a declarative sentence may be defined as in the following Table 3.

TABLE 3

| Main event of sentence | | | Auxiliary situation of sentence | |
|---|---|---|---|---|
| Step 1 sentence segment | Step 2 sentence segment | Step 3 sentence segment | Step 4 sentence segment | Step 5 sentence segment |
| Main agent | Action, (change in behavior/ existence) | Target of Action | Auxiliary condition | Criterion for auxiliary condition |

TABLE 3-continued

| Main event of sentence | | | Auxiliary situation of sentence | |
|---|---|---|---|---|
| Step 1 sentence segment | Step 2 sentence segment | Step 3 sentence segment | Step 4 sentence segment | Step 5 sentence segment |
| Subjct | Predicate | Objective, Complement | Modifier | Modifier |
| Noun | Verb Verb + Adjective | Noun Noun + Noun | Preposition | Noun |

Here, an adverb may be relatively freely positioned, so the position thereof is not specified. In some case, according to an arrangement method, the Step 4 or Step 5 sentence segment may come first in a sentence. However, this is one of ways of providing an auxiliary situation of an event, and it does not affect the logical flow of word arrangement.

According to the above principle, a declarative sentence is basically composed of the Step 1 and 2 step sentence segments, and the Step 3, Step 4, and Step 5 sentence segments may be omitted based on deployment of logics of content.

A declarative sentence may be analyzed according based on the above rule, as in the following Table 4.

TABLE 4

| Main event of sentence | | | Auxiliary situation of sentence | |
|---|---|---|---|---|
| Step 1 sentence segment | Step 2 sentence segment | Step 3 sentence segment | Step 4 sentence segment | Step 5 sentence segment |
| Main agent | Action, (change in behavior/ existence) | Target of Action | Auxiliary condition | Criterion for auxiliary condition |
| Subjct | Predicate | Objective, Complement | Modifier | Modifier |
| Noun | Verb Verb + Adjective | Noun Noun + Noun | Preposition | Noun |
| The sun | shines | | | |
| He | looks happy | | | |
| Seoul | Is | | above | busan |
| She | likes | flowers | | |
| He | Gave | me a look | | |
| I | Toss | a stone | in | a fountain |

Meanwhile, an imperative sentence starts with the Step 2 sentence segment, with the Step 1 sentence segment omitted. It is assumed that "you" is omitted from the Step 1 sentence segment in an imperative sentence, and this structure of the imperative sentence may be analyzed as in the following Table 5.

TABLE 5

| Main event of sentence | | | Auxiliary situation of sentence | |
|---|---|---|---|---|
| Step 1 sentence segment | Step 2 sentence segment | Step 3 sentence segment | Step 4 sentence segment | Step 5 sentence segment |
| Main agent | Action, (change in behavior/ existence) | Target of Action | Auxiliary condition | Criterion for auxiliary condition |
| Subjct | Predicate | Objective, Complement | Modifier | Modifier |

TABLE 5-continued

| Main event of sentence | | | Auxiliary situation of sentence | |
|---|---|---|---|---|
| Step 1 sentence segment | Step 2 sentence segment | Step 3 sentence segment | Step 4 sentence segment | Step 5 sentence segment |
| Noun | Verb Verb + Adjective Push | Noun Noun + Noun the button | Preposition | Noun |

While complying with the declarative sentence's basic method of arrangement of words, an interrogative sentence further include a function word (a question word or an auxiliary verb) positioned at the front in order to indicate a subject of question.

TABLE 6

| Step 0 sentence segment | Step 1 sentence segment | Step 2 sentence segment | Step 3 sentence segment | Step 4 sentence segment | Step 5 sentence segment |
|---|---|---|---|---|---|
| Object of question, which is 5W1H or existence/ behavior/ thought/ experience Question word, Auxiliary word | Main agent Noun | Action, (change in behavior/ existence) Verb Adjective | Target of Action Noun Noun + Noun | Auxiliary condition Preposition | Criterion for Auxiliary condition Noun |

An interrogative sentence is literally a question in the form of expressing the greatest interest in an object of question, and thus the object of question is positioned at the front of the sentence.

The object of question may be classified as existence, a behavior, a thought, experience, and 5W1H (when, where, who, what, why, and how). As for a question about existence, be verb is positioned in the Step 0 sentence segment as an auxiliary verb. As for a question about a behavior, do verb is positioned in the Step 0 sentence segment as an auxiliary verb.

As for a question about a thought, a helping verb is positioned in the Step 0 sentence segment as an auxiliary verb. As for a question about experience, have verb is positioned in the Step 0 sentence segment as an auxiliary verb: in this case, an adjective (a past participle indicative of completion) used together with the auxiliary verb is positioned in the Step 2 sentence segment.

As for a question about 5W1H, a question word indicative of existence/behavior/thought/experience is positioned in the Step 0 sentence segment.

The question word includes how and wh-words, such as an interrogative pronoun, an interrogative adjective, and an interrogative adverb. In the case of an interrogative sentence using an auxiliary verb, it is possible to use a question word at the front. In the case of an interrogative question using a question word, it is possible to omit content of a corresponding-step sentence segment (a Step 1, Step 3, Step 4, or Step 5 sentence segment) depending on whether an object of question is a subject, an object, or a modifier.

Even in a case where an object of question is part of a subject of the sentence, the Step 1 sentence segment may be omitted and therefore the Step 2 sentence segment may come first in the sentence.

An interrogative sentence made under the above rule may be expressed as in the following Table 7.

TABLE 7

| Step 0 sentence segment | Step 1 sentence segment | Step 2 sentence segment | Step 3 sentence segment | Step 4 sentence segment | Step 5 sentence segment |
|---|---|---|---|---|---|
| Object of question, which is 5W1H or existence/ behavior/ thought/ experience | Main agent | Action, (change in behavior/ existence) | Target of Action | Auxiliary condition | Criterion for Auxiliary condition |
| Question word, Auxiliary word | Noun | Verb Adjective | Noun Noun + Noun | Preposition | Noun |
| Is | She | happy? | | | |
| Does | He | love | dogs? | | |
| Would | You | like | it? | | |
| Have | You | lived | | in | Busan? |
| Who is | she? | | | | |
| What are | You | doing? | | | |
| What did | You | do | | on | sunday? |
| What can | I | do? | | | |
| What | | happened? | | | |

An exclamatory sentence is made in a manner of positioning an object of exclamation at the front of a declarative sentence. It is in a kind of inverted structure in an attempt to emphasize the object of exclamation, the structure in which an exclamatory word is positioned in the Step 0 sentence segment, the object of exclamation is positioned in an inverted sentence segment (the Step 2 or Step 3 sentence segment), wherein the Step 1 and Step 2 sentence segments are able to be omitted.

Meanwhile, a sentence is defined as a minimum unit of language which expresses a thought or feeling. A method of arrangement of English words is made based on the basic rules for satisfying requirements for a sentence, and thus, the basic rules may be defined as below:
  first, one sentence has only one verb;
  second, when a conjunction is used, another verb may be used after the conjunction; and
  third, verbs other than a main verb should be used in the form of "to+verb", "verb+ing", "root verb", "~ed", etc.

Following are three exemplary sentences suggested under the above rules.

The sentence "I made him was angry" has two verbs and fails to satisfy the first rule, and thus, it is an incorrect sentence. The sentence "I thought that he was honest" has two verbs with a conjunction, and thus, it is a correct sentence. The sentence "I like to swim" is a correct sentence in compliance with the third rule.

Meanwhile, expansion of an English sentence means that essential elements of a sentence are defined and additional words are further arranged in compliance with consistent rules and according to characteristics of positions for the elements.

As described above regarding the method of arrangement of English words, words of a sentence are arranged sequentially in five sentence segments.

Figure 2:
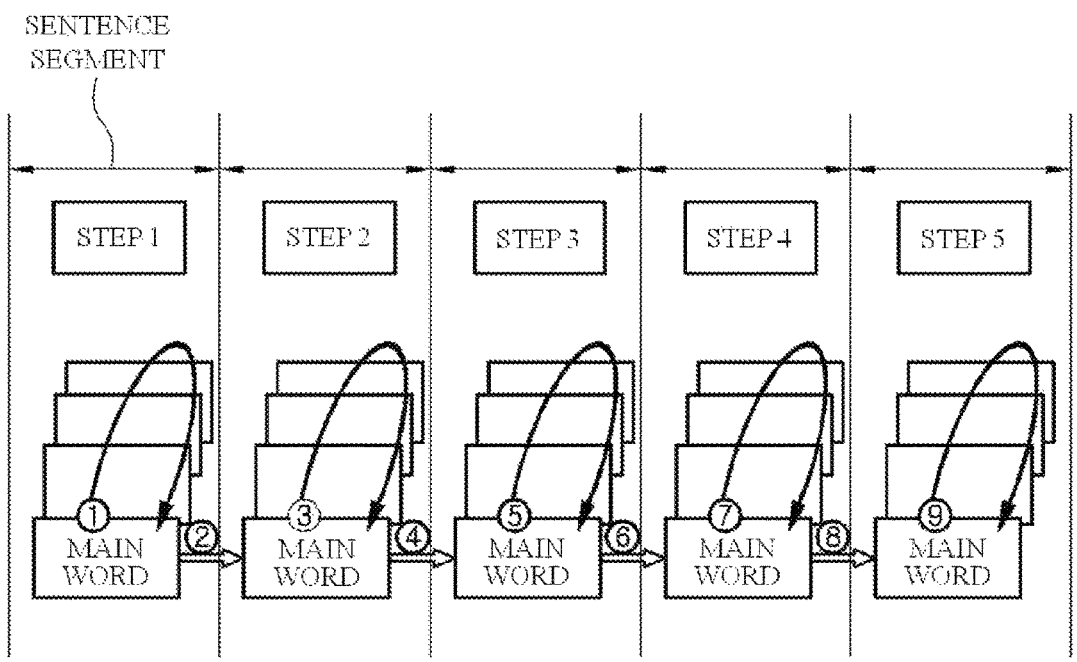
FIG. 2 is a diagram illustrating expansion of an English sentence.

As illustrated in FIG. 2, an English sentence may be expanded in a constant word order such that the sentence is divided into sentence segments and consists of a main word and other words indicative of a relationship to the main word in each sentence segment.

Each sentence segment has a main word, and word arrangement expansion is made in a manner in which additional words are arranged before and after the main word.

At this point, there is a rule of arrangement of words that a next sentence segment starts when logical development of words in one sentence segment is complete. Thus, if a characteristic of a main word of each sentence segment is defined and then sentence expansion principles of such main words are defined, the basic principle of sentence expansion may be defined.

At this point, the determiners/adjectives/other nouns are arranged to indicate attributes of the noun which is the main word.

In this case, words are arranged in the following constraints: i) an article and other determiner are not used consecutively; ii) a determiner has to come before an adjective; iii) an adjective has the same sequence as shown in the following Table 9; and iv) a compound noun may be in the form of "noun+noun", wherein a number of nouns can be enumerated (for example, a security card).

TABLE 9

|  | Ajactive | | | | | | | |
| --- | --- | --- | --- | --- | --- | --- | --- | --- |
| Article | Opinion | Size | Age/Era | Shape | Color | Origin | Material | Objective | Noun |
| a | silly | | young | | | english | | | girl |
| a | | small | | round | | | paper | | cup |
| a | | big | | | blue | | | sleeping | back |

In this case, a part of speech for each word, which is suggested in the aforementioned method of arrangement of words based on functions thereof, acts as a main word, and following are principles of word arrangement expansion based on a part of speech.

Such a principle of word arrangement expansion may be expressed as in the following Table 8.

TABLE 8

| Main event of sentence | | | Auxiliary condition of event | |
| --- | --- | --- | --- | --- |
| Step 1 sentence segment | Step 2 sentence segment | Step 3 sentence segment | Step 4 sentence segment | Step 5 sentence segment |
| Main agent | Action, (change in behavior/ existence) | Target of Action | Auxiliary condition | Criterion for auxiliary condition |
| Subject | Predicate | Object, Complement | Modifier | Modifier |
| Noun | Verb Verb + Adjective | Noun + Noun | Preposition | Noun |
| Main word (Noun) ↓ Expansion within sentence segment | Main word (Verb) ↓ Expansion within sentence segment | Main word (Noun) ↓ Expansion within sentence segment | Main word (Preposition) ↓ Expansion within sentence segment | Main word (Noun) ↓ Expansion within sentence segment |

The basic principles of expansion of a English sentence are classified into: a principle of expanding a sentence based on a noun which is suggested as a main word in the Step 1, Step 3, and Step 5 sentence: a principle of expanding a sentence based on a verb which is suggested as a main word in the Step 2 sentence segment; a principle of expanding a sentence based on a preposition which is suggested as a main word in the Step 4 sentence segment; a principle of expanding a sentence based on connection of two sentences, and other principles.

In the principle of expanding a sentence based on a noun, word arrangement expansion is made under the following basic rules.

First, additional words are arranged in a manner of describing a noun, which acts as a main word, with various determiners (articles, possessives, demonstrative, quantifiers, infinite pronouns), adjectives, and other nouns.

Second, in the case of using Korean, a sentence to be described is arranged first, and a noun to be modified is arranged at the end.

For example, the Korean sentence " 내가 가르치고 있는 학생 " is considered to be a combination of a sentence "내가 가르치고 있다 " and a noun "학생 " which is modified.

On the contrary, in the case of using English, a noun, which is a main word, is arranged first, and then a sentence is arranged. For example, "Student (that) I am teaching" is considered reflecting this rule.

In this case, word arrangement expansion should be made in compliance with the basic rules of arrangement of English words, because a noun exiting in a sentence needs to be described with the sentence.

To provide further clear understanding about a sentence which modifies a noun, it is necessary to newly define a concept of a sentence knot.

Figure 3:
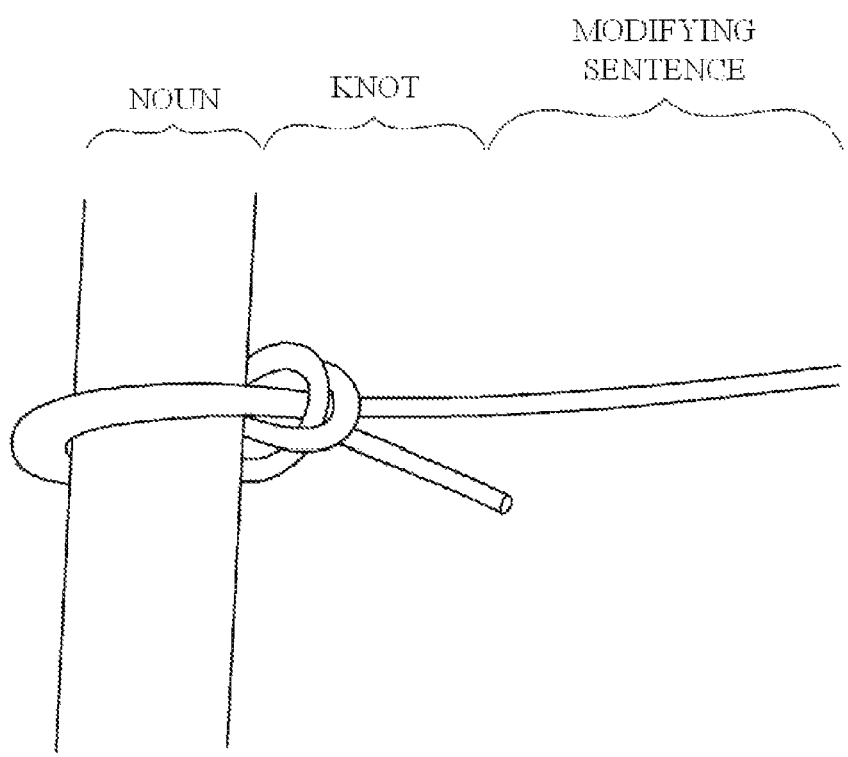
FIG. 3 is a diagram illustrating a modifying sentence.

As illustrated in FIG. 3, a pole corresponds to a noun, a rope corresponds to a modifying sentence, and a relationship between a noun and the modifying sentence corresponds to tying up the rope to the pole. In order to tie up the rope to the pole, it is required to tie a knot.

Just like a rope, which is changed in shape when a knot is tied, a kind of knot appears in a sentence when the sentence is changed into a modifying sentence.

Even though a sentence knot occurs due to a sentence which modifies a noun positioned in the Step 1, Step 3, or Step 5 sentence segment, the basic rules of arrangement of English words may be complied with.

The forms of a sentence knot may be divided into i) a form in which a function word able to act as a conjunction is added at the front of a modifying sentence, ii) a form in which a verb is omitted, iii) a form in which a verb is in the form of "to+verb", "verb+ing", "verb+~ed", and "root verb."

A modifying sentence for describing a noun (a main word) may be classified as one of the following three types: i) a conjunctive function word+a modifying sentence; ii) a sentence with a verb omitted (preposition+noun, adjective); and iii) verbial adjective (to+verb, verb+ing, and verb+~ed).

The conjunctive function word+modifying sentence type is a method in which a function word (a conjunction, a relative pronoun, a relative adverb, etc) acting as a conjunction is positioned first and then a sentence follows to modify a noun (main word). This type may be expressed as in Table 10.

TABLE 10

| Noun (Main word) | Conjunctive function word | Modifying sentence | | | | |
|---|---|---|---|---|---|---|
| | | Step 1 | Step 2 | Step 3 | Step 4 | Step 5 |
| the fact | that | I | have | it | | |
| the book | which | I | read | | in | school |
| the place | where | I | met | her | | |

In the case of "the fact that I have it", the conjunction that is used to modify a noun. In the case of "the book which I read", a modifying sentence comes after the relative pronoun which, wherein one of the Step 1, Step 3, and Step 5 sentence segments is omitted in the modifying sentence.

In the case of "the place where I met her", a modifying sentence comes after the relative adjective where. In this case, the Step 4 and Step 5 sentence segments are generally omitted.

The "conjunctive function word+modifying sentence" type is a case in which a conjunction is used to connect sentences, and thus, it is fine to use a verb corresponding to the Step 2 without making any change thereto.

For example, the above sentence may be used together with "I remember the place where I met her". In some cases, a position of the conjunction may be omitted, just like "It's the book (which) I read in school."

Regarding a method of omitting a subject or verb in a modifying sentence, removal of a conjunction and a verb from the modifying sentence is possible only when the modifying sentence is in the form of "be+preposition+noun" or "be+adjective."

For example, "The people (who is) in Seoul use subway a lot" and "This is a medicine (which is) good for your health" correspond to the above form. That is, it is a case where a sentence is in a word arrangement structure in which "preposition+noun" or "adjective" comes after a noun (main word).

If a sentence modifying a noun (main word) does not use a conjunction, it may fail to comply with the rule requiring that one sentence has to have only one verb. In order to comply with this rule, it is required to change a verb included in the modifying sentence into an adjective.

To change a verb into an adjective, to-infinitives (to +verb), present participle (verb+ing), past participle (verb+ed) are used.

"I want something to drink", "There are the man watering the tree", and "I had my leg broken in the accident" are all exemplary sentences in which a verb is changed into an adjective, because a modifying sentence does not use a conjunction.

Third, to comply with the above basic rules of an English sentence even when a full sentence is inserted to replace a noun (main word), the above-described principle regarding a sentence knot needs to be applied.

Insertion of a full sentence to replace a noun (main word) using a sentence knot may be done in the following three types.

The three types include: i) a conjunction+a sentence, ii) a question word+to verb, iii) verbial noun (to +verb, verb+ing, verb+ed).

The conjunction+sentence type corresponds to a case in which a full sentence is inserted into a position of a main word in the Step 1, Step 3, or Step 5 sentence segment. "I know that he is rich" corresponds to the conjunction+sentence type. "Tell me when to stop" corresponds to the question word+to verb type. "I hate to trouble you" or "Learning English is easy" correspond to the verbial noun type.

In addition, in the case of "to +changed formation of a verb" in an inserted sentence, for may or may not be used to indicate a semantic subject and to or to be may be omitted. "They made her happy" corresponds to this case.

Hereinafter, a principle of expansion of a sentence based on a verb is described.

In the principle of expansion of a sentence based on a verb, word arrangement expansion is made in the following basic rules: i) an auxiliary verb (a helping verb)+verb ii)) an auxiliary verb (have, be)+a verbial adjective (present particle, past particle), and iii) a link/sense verb+an adjective.

The principle of expansion of a sentence based on the auxiliary verb (helping verb)+verb rule is described.

A verb expresses action of a subject which is the main agent. At this point, a verb may convey the meaning of an imaginery or future action, not the meaning of an actual action.

In other words, to express various atmospheres about a degree/state of a thought of the main agent, a helping verb, which is an auxiliary verb, may be selectively positioned in front of a verb.

A helping verb is often used in a future tense in order to indicate a change in a behavior or existence not yet happened or a change in an imaginary behavior or existence. It is used to show a degree/state of a thought, and thus, a root verb subsequently follows the helping verb.

Various helping verbs are used to show a degree/state of a thought, and may be divided in the following order according to the intensity, atmosphere, and a degree of dynamic thereof. The order of helping verbs is set bit differently depending on a scholar. Nevertheless, the helping verbs may be classified as follow according to intensity, atmosphere, and a degree of dynamics thereof.

must>should>shall>will>can>would>could>may>might

In the case of turning a verb into an adjective based on the second auxiliary+verb rule, a verb indicative of movement is turned into an adjective (participle) indicative of a particular state of the verb, and a helping verb (have, be) having no special meaning is used at a position of the verb.

At this point, the particular state of the verb includes three types, such as i) perfect tense (have+past participle), ii) continuous tense (be+verb+participle), and iii) passive state (be verb+past participle).

Every verb indicates an action and thus means the start to end of the action.

In other words, every verb connotes the meaning of an overall movement.

As such, due to the characteristic of indicating an action, a verb is affected by a tense indicative of a temporal concept, and this is regarded a significant characteristic of the verb.

In general communication, people may use an expression focused not on the action itself, but on a particular point in time during the action. In this case, a verb indicative of the action is turned into an adjective indicative of a particular attribute of the verb in order to convey the meaning, and, in this coure, an auxiliary verb is further added based on the rule that requires that one sentence have only one verb.

The type i) is a way of expression focused on a point in time when an action started from the past is complete, the expression which refers to as a perfect tense of the action.

In this type, have is used as an auxiliary verb which acts just functionally, and a past participle is used to convey the real meaning of the action.

Although the past participle is an adjective in terms of a part of speech, it may be referred to as a semi-verb, because it is changed from a verb. In addition, the past participle may have a target of the action (object).

The type ii) is a way of expression focused on a state in which an action started from the pas is not yet complete, the expression which is referred to as a continuous tense that is a grammar term.

In this type, be verb is used as an auxiliary verb which acts just functionally, and a present participle is used to convey the real meaning of the action.

The present participle is an adjective in terms of a part of speech, it may be referred to as a semi-verb, because it is changed from a verb. In addition, the past participle may have a target of the action (object).

The type iii) is a way of expression of a case in which a noun corresponding to a subject, which is a main agent, is a target of change, not a main agent leading to a change in behavior/existence. Generally, such a case indicates a passive state which is a grammar term.

In such a type, be verb is used as an auxiliary verb which acts just functionally, and a past participle is used to convey the real meaning of the action.

The past participle is an expression indicative of a state in which an action has been complete. The past participle is often used with a preposition by to indicate a main agent of an action, because a main agent of the action is not consistent with a subject of the sentence.

The third link/sense verb+adjective type is a case in which a meaning of a predicate of a sentence is expanded using an adjective when a verb alone in the Step 2 sentence segment is not enough to fully describe the predicate.

Such a case happens especially to a link verb or a sense verb. The link verb is used to connect a subject and a complement equally, and a typical example of the link verb is be verb. In a case where another link verb (become, get, etc.) replaces be verb, it may often convey the same meaning as be verb.

The sense verb is used to express a sense-related event which occurs during unconsciousness. In many cases, be verb is able to replace a sense verb (look, seem, appear, sound, smell, taste, feel, etc.) and often convey the same meaning as the sense verb.

Meanwhile, the principle of expansion of a sentence based on a preposition does not have special methods, except for utilizing a preposition which consists of two or more words, such as in spite of in front of next to, instead of and out of.

In addition, there are some words which are in the form of a preposition but used as adverbs.

An adverb is used to modify a verb and, in many cases, the adverb is not necessarily located at a particular position in a sentence. And thus, it is good enough if an adverb is distinguishable in the principle of expansion.

In the case of the principle of expansion through connection of two sentences is a principle which is applicable when a new sentences comes after words of one sentence are completely arranged in order in a case where it is not possible to arranged words in the aforementioned word order There may be two ways of connecting two sentences: using a conjunctive function word and omitting a conjunction.

For example, "He and I are very close friends" is a sentence in which there are two or more subjects and object with a conjunctive function word (and, or, etc). In another example, "We built a snow fort and threw snowballs" is a sentence in which further words are arranged using a structure connecting two sentences.

"I am glad to see you" is a sentence which is a combination of two sentences, and corresponds to a case where adverbial infinitive is used with a conjunctive function word omitted.

It is possible to omit a conjunction connecting two sentences, and instead change a verb of the following sentence according to the principle regarding a sentence knot. Even in this case, the rule requiring that one sentence have only one verb is complied with, and a participle clause corresponds to a combination of two sentences, and thus, sentence expansion is made in the same principle as the adverbial infinitive.

In addition, words are arranged in an inverted order to emphasize a negative word, an object, a complement, or an adverb. In this course, an auxiliary verb may be added, resulting in sentence expansion.

A negative word is inverted in a manner in which the negative word is positioned at the front of a sentence along with a verb affected by the negative word. In this case, the verb positioned together with the negative word in the front of the sentence is considered to have characteristics of an auxiliary verb (be verb, do verb, helping verb), and a main verb remains at the original position.

If do verb is used, an auxiliary verb which does not exist in an original sentence is added.

For example, "He was never foolish" may be inverted into "Never was he foolish", in which "was" acts as an auxiliary verb and a main verb is "foolish." Similarly, "He never runs" may be inverted into "Never does he run", in which "does" acts as an auxiliary verb and a main verb is "run."

If an adverb is inverted, a sentence appears to be arranged in a different order. For example, "A cup on the table is there" may be inverted into "There is a cup on the table." In another example, "The teacher comes here" may be inverted into "Here comes the teacher."

Hereinafter, there is described a means for providing, to learners, a much easier and more systematically English learning method based on the above-described spontaneous rules of arrangement of English words.

The present disclosure has introduced a concept of an "English word order map."

The English word order map is defined as a drawing in which functions (roles and order) of elements of an English sentence are shown sequentially and three-dimensionally with predetermined symbols and images.

The English word order map is made by using predetermined symbols and structural description methods to newly define the above-described rules of arrangement of English words and the above-described principles regarding expansion of a sentence.

The English word order map is made by combining a basic word order map and an expansion word order map in order to systematically express arrangement and expansion of a sentence, and the expansion word order map is made by combining a basic expansion word order map and a sentence expansion word order map.

The basic word order is a word order map which is the basis of explaining the basic rules of arrangement of words based on the spontaneous rules of arrangement of an English sentence and the rules for arrangement of words of an English sentence based on functions of the words.

The basic word order map is a word order map in which each sentence segment has only a basic main word and is not expanded at all.

Role composition of words, which corresponds to a basic word order map based on a sentence type, is as below.

TABLE 11

| Type | Step 0 sentence segment | Step 1 sentence segment | Step 2 sentence segment | Step 3 sentence segment | Step 4 sentence segment | Step 5 sentence segment |
|---|---|---|---|---|---|---|
| Declarative sentence | — | Noun | Verb | Noun | Prepsition | Noun |
| Imperative sentence | — | — | Verb | Noun | Preposition | Noun |
| Interrogative sentence | Question word, Auxliary verb | Noun | Verb | Noun | Preposition | Noun |
| Exclamatory sentence | Exclamatory word, Determiner, Adjective, Adverb, Noun | Noun | Verb | | | |

Not many sentences conforms to the basic word order map because a sentence is able to be expanded even when only a single article is used to modify a noun.

Therefore, the most common sentence type conforms to the expansion word order map that may be separate into the basic expansion word order map and the sentence expansion word order map.

The basic word order map refers to a word order map which is an expanded from the center of a main word, not from the center of a sentence element, in the basic word order map based on a sentence type. The basic expansion word order map conforms to the basic principles of expansion of an English sentence, except for the cases of sentence expansion using a modifying sentence and using an inserted sentence.

Role composition of words, which corresponds to the basic expansion word map based on a sentence type, is as in the following Table 12.

The sentence expansion word order map indicates a word order map in which sentence expansion occurs due to a sentence element in a sentence segment in the basic word order map based on a sentence type or the basic expansion word order map.

The sentence expansion word order map indicates a word order map that is based on sentence expansion using a modifying sentence and an inserted sentence out of the basic principles of expansion of an English sentence.

Role composition of words, which corresponds to the basic principle of expansion according to a sentence type, is as below.

TABLE 12

| Type | | Step 0 sentence segment | Step 1 sentence segment | Step 2 sentence segment | Step 3 sentence segment | Step 4 sentence segment | Step 5 sentence segment |
|---|---|---|---|---|---|---|---|
| Declarative sentence | Basic Expansion element | | Noun Determiner Adjective Noun — | Verb Helping word Auxiliary verb Link verb Adjective | Noun Determiner Adjective Noun — | Preposition Preposition — — | Noun Determiner Adjective Noun — |
| Imperative sentence | Basic Expansion element | — | — | Verb Helping verb Auxiliary verb Link verb Adjective | Noun Determiner Adjective Noun — | Preposition Preposition — — | Noun Determiner Adjective Noun — |
| Interrogative sentence | Basic | Question word Auxiliary verb | Noun | Verb | Noun | Preposition | Noun |
| | Expansion element | — | Determiner Adjective Noun | Adjective | Determiner Adjective Noun | Preposition — | Determiner Adjective Noun |
| Exclamatory sentence | Basic | Question word Determiner Adjective, Adverb Noun | Noun | Verb | — | — | — |
| | Expansion element | — | Determiner Adjective Noun | Helping verb Auxiliary verb Link verb Adjective | — | — | — |

TABLE 13

| Type | | Step 0 sentence segment | Step 1 sentence segment | Step 2 sentence segment | Step 3 sentence segment | Step 4 sentence segment | Step 5 sentence segment |
|---|---|---|---|---|---|---|---|
| Declarative Sentence | Basic Basic expansion element | — | Noun Determiner Adjective Noun | Verb Helping verb Auxiliary Verb Link Verb Adjective | Noun Determiner Adjective Noun — | Preposition Preposition — — | Noun Determiner Adjective Noun |
| | Expansion element | — | Conjunctive sentence Verb-omitted sentence Verb-form changed sentence | — | Conjunctive sentence Verb-omitted sentence Verb-form changed sentence | — | Conjunctive sentence Verb-omitted sentence Verb-form changed sentence |
| Imperative Sentence | Basic Basic expansion element | — | — — | Verb Helping verb Auxiliary verb Link verb Adjective | Noun Determiner Adjective Noun — | Preposition Preposition — — | Noun Determiner Adjective Noun |
| | Expansion element | — | Conjunctive sentence Verb-omitted sentence | — | Conjunctive sentence Verb-omitted sentence Verb-form changed sentence | — | Conjunctive sentence Verb-omitted sentence Verb-form changed sentence |
| Inter-rogative SEntence | Basic | Question word, Auxiliary Verb-form changed sentence verb | Noun | Verb | Noun | Preposition | Noun |
| | Basic Expansion element | — | Determiner Adjective Noun | Adjective | Determiner Adjective Noun | Preposition | Determiner Adjective Noun |
| | Expansion element | | Conjunctive sentence Verb-omitted sentence Verb-form changed sentence | — | Conjunctive sentence Verb-omitted sentence Verb-form changed sentence | — | Conjunctive sentence Verb-omitted sentence Verb-form changed sentence |
| | Basic | Exclamatory word Determiner Adjective/ Adverb Noun | Noun | Verb | — | — | — |
| Exclam-atory Sentence | Basic Expansion element | — | Determiner Adjective Noun | Helping verb Auxilary verb Link verb Adjective | | | |
| | Expansion element | — | Conjunctive sentence Verb-omitted sentence Verb-form changed sentence | | Conjunctive sentence Verb-omitted sentence Verb-form changed sentence | | Conjunctive sentence Verb-omitted sentence Verb-form changed sentence |

Sentence expansion occurring due to a sentence element has the basic configuration as below. In addition, the descriptions about the basic expansion word order map are applied to the basic principle of expansion of each word.

TABLE 14

| Type | Conjunctive function word | Step 1 sentence segment | Step 2 sentence segment | Step 3 sentence segment | Step 4 sentence segment | Step 5 sentence segment |
|---|---|---|---|---|---|---|
| Conjuctive sentence | Conjunction | Noun | Verb | Noun | Preposition | Noun |
|  | Relative pronoun | (Noun) | Verb | (Noun) | Preposition | (Noun) |
|  | Relative adverb | Noun | Verb | Noun |  |  |
| Verb-omitted sentence | — | — | — | — | Preposition | Noun |
|  | — | — | Adjective | — | Preposition | Noun |
| Verb-changed sentence | — | (for) Noun | to + Verb | Noun | Preposition | Noun |
|  | — | (of) Noun | Verb + ing | Noun | Preposition | Noun |
|  | — | — | (being) + Verb + ed | Noun | Preposition | Noun |

Figure 11:
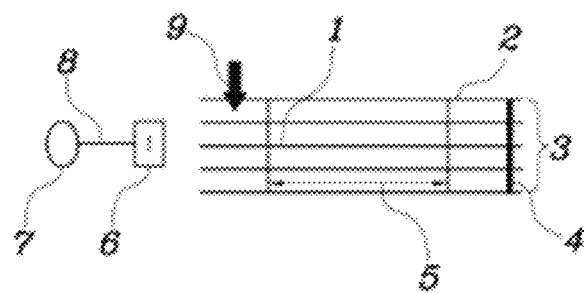
FIG. 11 illustrates nine basic elements predetermined for drafting an English word order map.

The present disclosure uses nine basic elements predetermined for drafting an English word order map, as illustrated in FIG. 11.

A sentence segment distinguishing line is a symbol used to distinguish sentence segments of a sentence and indicate a beginning point and an ending point of word order expansion occurring due to a sentence expansion element.

A sentence level distinguishing line is a symbol used to three-dimensionally distinguish a basic sentence and an expansion sentence when word order expansion occurs due to a sentence expansion element.

The sentence distinguishing line is a symbol used to indicate a beginning point and an end point of a sentence.

The sentence segment region line is a symbol used to distinguish the whole region of a sentence segment divided by a sentence expansion distinguishing line when word order expansion occurs due to a sentence expansion element.

A sentence segment sequence symbol is a symbol used to indicate a sequential step of a corresponding sentence segment, wherein the sentence segment sequence symbol is placed at a location of a main word of the corresponding sentence segment. A simple symbol is a symbol used to indicate a word other than the main word of the sentence segment.

A modification relation line is a symbol used to indicate a functional relationship between words, and a navigator is a symbol used to indicate a location of a particular word to explain content of the English word order map.

Regarding the principle regarding symbols in the basic word order map, one sentence consists of sequential sentence segments displayed at an equal level according to a method of arrangement based on functions of words. A declarative sentence is shown using distinguishing lines for five step (1-2-3-4-5) sequential sentence segments.

An imperative sentence is shown using distinguishing lines for four step (2-3-4-5) sequential sentence segments, an interrogative sentence is shown using distinguishing lines for six step (0-1-2-3-4-5) sequential sentence segments, and an exclamatory sentence is shown using distinguishing lines for three step (0-1-2) sequential sentence segments. A main word of a sentence segment is indicated by a sentence segment sequence symbol in order to show a sequence the sentence segment.

When word order expansion occurs in a sentence segment, a sequence symbol is placed at a location of a main word of the sentence segment, while simple symbols are used to indicate other words.

In this case, the articles "a" and "the" not main words, and thus, they are indicated with simple symbols.

Figure 12:
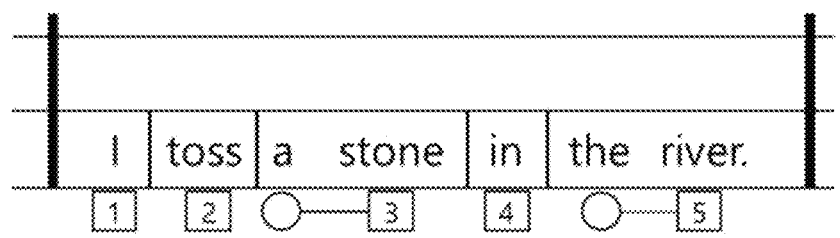
FIG. 12 illustrates a first exemplary sentence.

As shown in FIG. 12, a simple symbol is displayed in association with a sentence segment sequence symbol and a modification relation line in a sentence segment. Thus, in FIG. 12, the modification relation lines indicate that the article "a" is related to "stone" and that the article "the" is related to "river."

Figure 13:
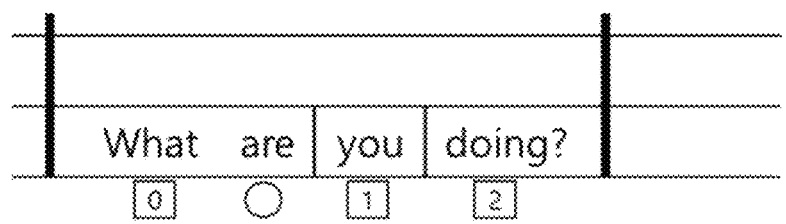
FIG. 13 illustrates a second exemplary sentence.

As shown in FIG. 13, if an interrogative sentence has a question word in the Step 0 sentence segment, a sentence segment sequence symbol is displayed to indicate the question word, and, if an auxiliary verb is used together, a simple symbol is displayed to indicate the anxiliary verb.

Figure 14:
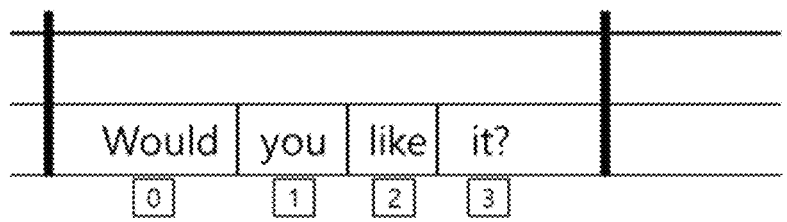
FIG. 14 illustrates a third exemplary sentence.

As shown in FIG. 14, if an interrogative sentence has an auxiliary verb in the Step 0 sentence segment, a sentence segment sequence symbol is displayed to indicate the auxiliary verb.

Figure 15:
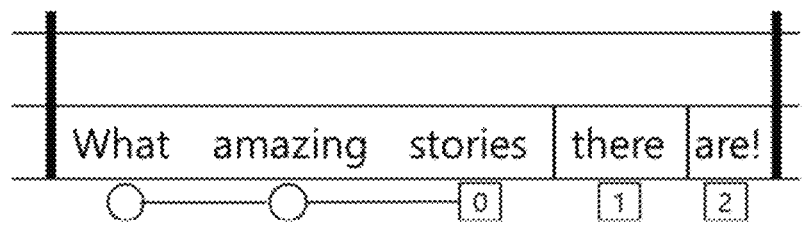
FIG. 15 illustrates a fourth exemplary sentence.

As shown in FIG. 15, if an exclamatory sentence starts with what in the Step 0 sentence segment, a sentence segment sequence symbol is displayed to indicate a noun which is an object of exclamation, while an exclamatory word and an adjective modifying the the noun are indicated with simple symbols.

Figure 16:
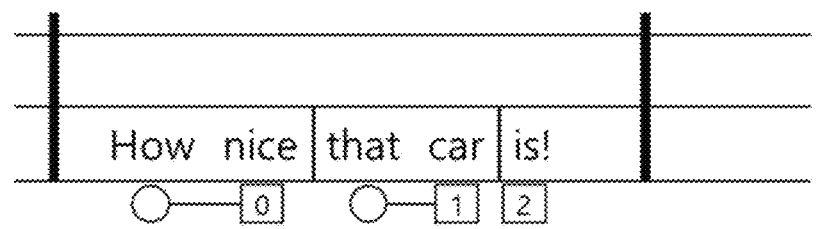
FIG. 16 illustrates a fifth exemplary sentence.

As shown in FIG. 16, if an exclamatory sentences starts with how in the Step 0 sentence segments, a sentence segment sequence symbol is displayed to indicate an adjective or an adverb which is an object of exclamation, while an exclamatory word is indicated with a simple symbol.

Figure 17:
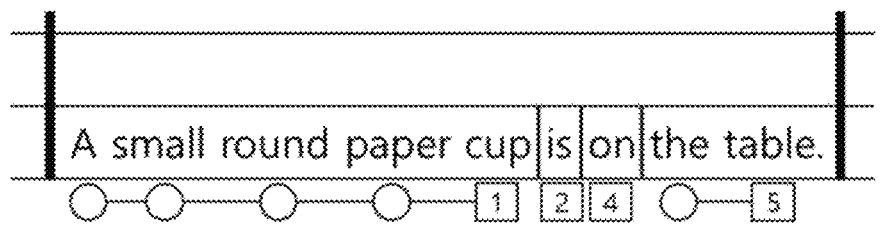
FIG. 17 illustrates a sixth exemplary sentence.

As shown in FIG. 17, each main word of the Step 1, Step 3, and Step 5 sentence segments is indicated by a sentence segment sequence symbol, and other words, such as a determiner, an adjective, and a noun, are indicated by simple symbols.

Figure 18:
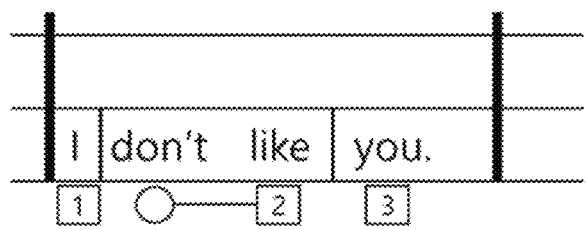
FIG. 18 illustrates a seventh exemplary sentence.

As shown in FIG. 18, an auxiliary verb and an adverb in the Step 2 sentence segment are indicated by simple symbols to make a negative sentence, and a following root verb is indicated by a sentence segment sequence symbol. At this point, if the auxiliary verb and an adverb creating a negative meaning are in a contraction form, only one simple symbol may be used.

Figure 19:
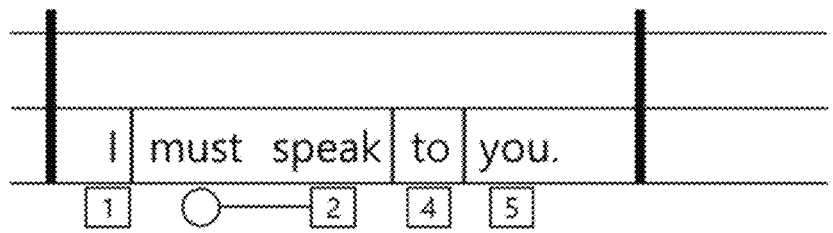
FIG. 19 illustrates an eighth exemplary sentence.

As shown in FIG. 19, a helping word in the Step 2 sentence segment is indicated by a simple symbol, and a following root verb is indicated by a sentence segment sequence symbol.

Figure 20:
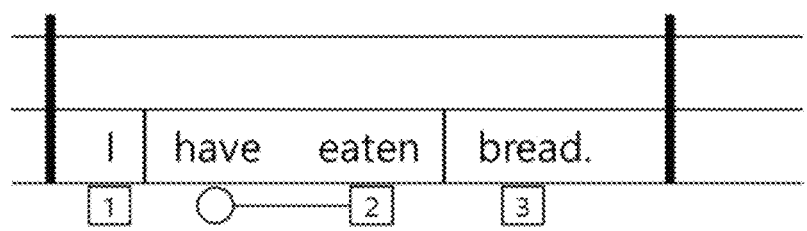
FIG. 20 illustrates a ninth exemplary sentence.

As shown in FIG. 20, an auxiliary verb, such as be verb and have, is indicated by a simple symbol, and a following adjective, such as a past participle and a present participle, is indicated by a sentence segment sequence symbol.

Figure 21:
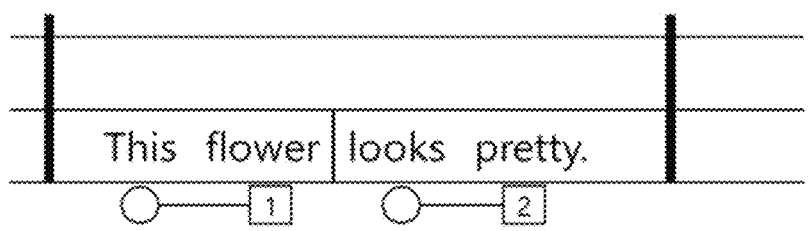
FIG. 21 illustrates a tenth exemplary sentence.

As shown in FIG. 21, a link verb or a sense verb in the Step 2 sentence segment is indicated by a sentence segment sequence symbol. If the link or sense verb is used together with a following adjective, the link or sense verb is indicated by a simple symbol while the following adjective is indicated by a sentence segment sequence symbol.

Figure 22:
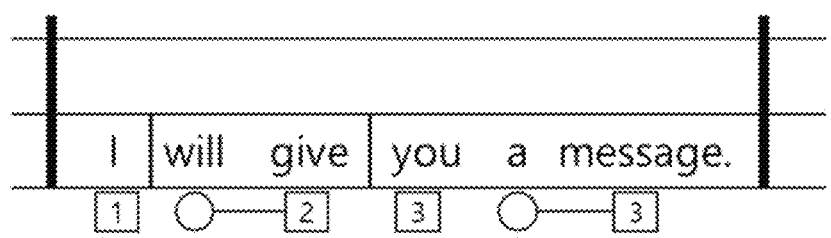
FIG. 22 illustrates an eleventh exemplary sentence.

As shown in FIG. 22, even when two nouns appear to be a main word of the Step 3 sentence segment, the two nouns are indicated by the same sentence segment sequence symbol.

Figure 23:
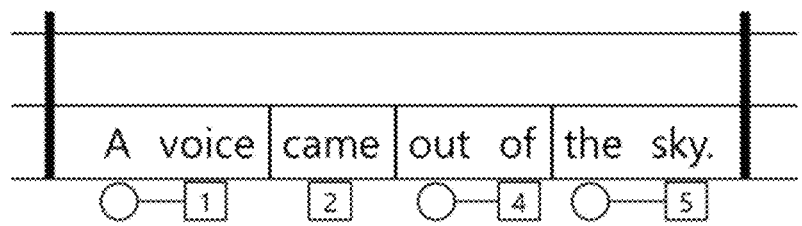
FIG. 23 illustrates a twelfth exemplary sentence.

As shown in FIG. 23, if a main word (preposition) consisting of two or more words is positioned in the Step 4 sentence segment, the last word thereof is indicated by a sentence segment sequence symbol and other words thereof are indicated by a simple symbol.

Figure 24:
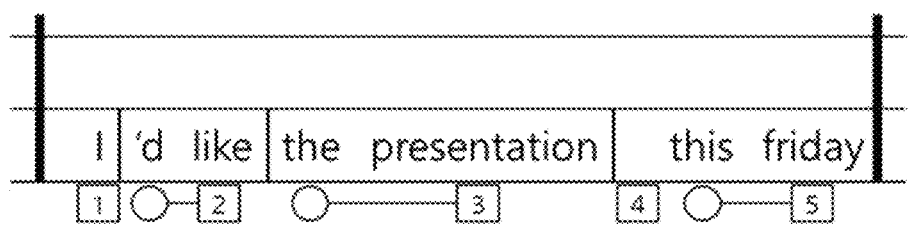
FIG. 24 illustrates a thirteenth exemplary sentence.

As shown in FIG. 24, if a preposition is omitted from the Step 4 sentence segment, a sentence segment sequence symbol may be used to indicate the omitted preposition.

Figure 25:
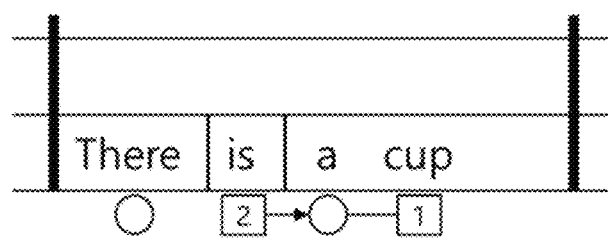
FIG. 25 illustrates a fourteenth exemplary sentence.

As shown in FIG. 25, if a sentence is inverted, a sentence segment symbol is used to indicate a sequence of a corresponding sentence segment in an original sentence, and an arrow is used to indicate an additional direction.

"There is a cup" is inverted from "A cup is there" in order to emphasize the adverb there. Thus, a symbol indicative a characteristic shown in the original sentence is displayed, and an arrow is displayed in the Step 2 sentence segment.

Figure 26:
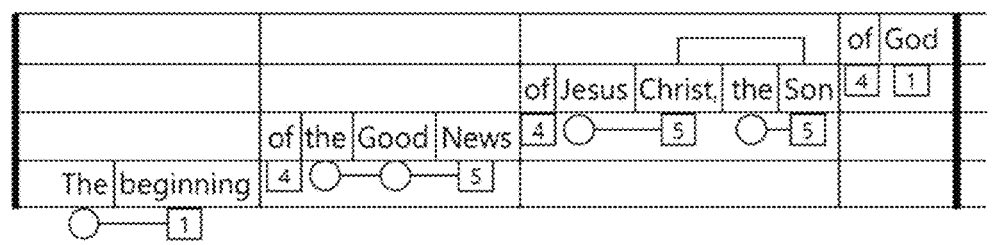
FIG. 26 illustrates a fifteenth exemplary sentence.

As shown in FIG. 26, a word indicative of apposition may be placed together with a corresponding word at the same sentence level, and the apposition of the corresponding word to another word may be indicated by a symbol.

For example, in FIG. 26, "Jesus Christ" and "the Son" are in apposition thereto, and a symbol is used to indicate the apposition.

If sentence expansion occurs in a sentence segment due to an intertextual element (a modifying sentence or an inserted sentence), sentence expansion distinguishing lines are used. At this point, part of a sentence segment is displayed at a different level from the basic word order map or the basic expansion word order map from the beginning of the sentence expansion distinguishing line.

Figure 27:
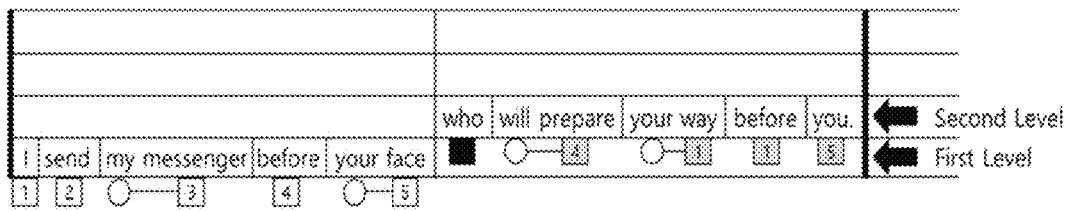
FIG. 27 illustrates a sixteenth exemplary sentence.

As shown in FIG. 27, a sentence after "who" is a modifying sentence, and thus, a sentence expansion distinguishing line is put in front of who and the sentence is displayed at a different sentence level.

In addition, a modifying sentence may be displayed differently in height or size than the basic word order map. For example, symbols of different colors may be used for the first level and the second level.

Figure 28:
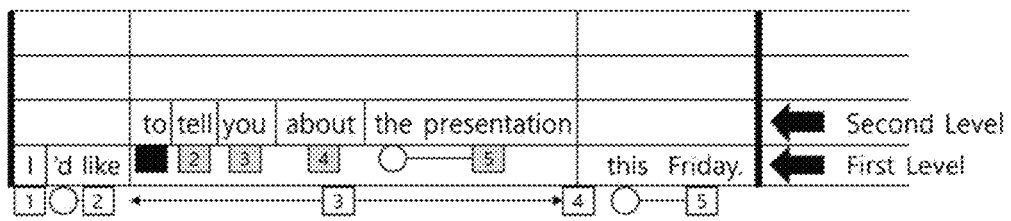
FIG. 28 illustrates a seventeenth exemplary sentence.

An inserted sentence may be displayed differently in height and size from the basic word order map. In FIG. 28, "to tell you about the presentation" is an inserted sentence which may be displayed at the second level to be distinguished from the basic sentence at the first level.

In addition, a sentence segment region line and a sequence symbol of a corresponding sentence segment may be used together across the whole sentence segment in which sentence expansion has occurred. In FIG. 28, "to tell you about the presentation" is an inserted sentence which corresponds to the Step 3 sentence segment in light of the basic word order map, and thus, it may be indicated by a symbol of "◂──────[3]──────▸".

Figure 29:
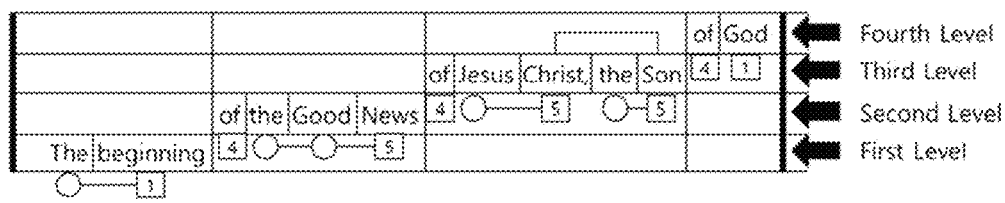
FIG. 29 illustrates an eighteenth exemplary sentence.

As shown in FIG. 29, if sentence expansion occurs in a modifying sentence or an inserted sentence, a sentence contained in the modifying sentence or the inserted sentence may be displayed at different height or in different size, compared to the modifying sentence or the inserted sentence.

Figure 30:
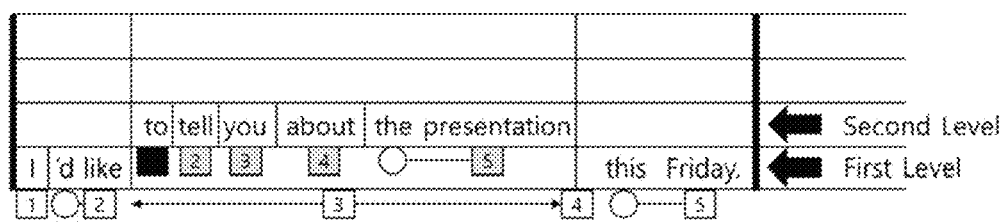
FIG. 30 illustrates a nineteenth exemplary sentence.

As shown in FIG. 30, the same symbol usage method is applicable even to a modifying sentence and an inserted sentence, and a color or size of a symbol may be changed.

Figure 31:
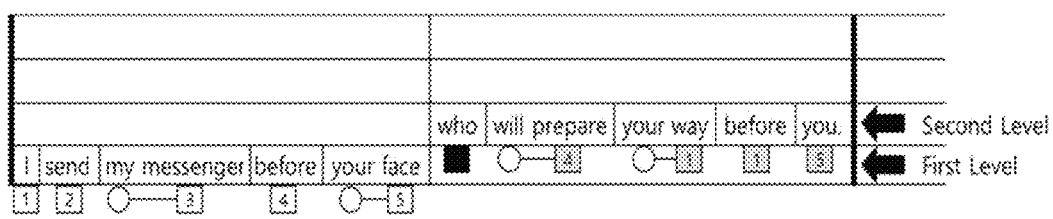
FIG. 31 illustrates a twentieth exemplary sentence.

As shown in FIG. 31, function words, such as a conjunction, a relative pronoun, and to which has a conjunctive function, may be positioned at the beginning point of a sentence expansion distinguishing line to enable easy distinction. For example, "who" used instead of a relative pronoun may be indicated by a symbol "■."

For or of which are used to indicate a subject of a sentence expanded from the beginning point of the sentence expansion distinguishing line may be indicated by a simple symbol to make it distinguishable from a preposition of the Step 4 sentence segment.

Figure 32:
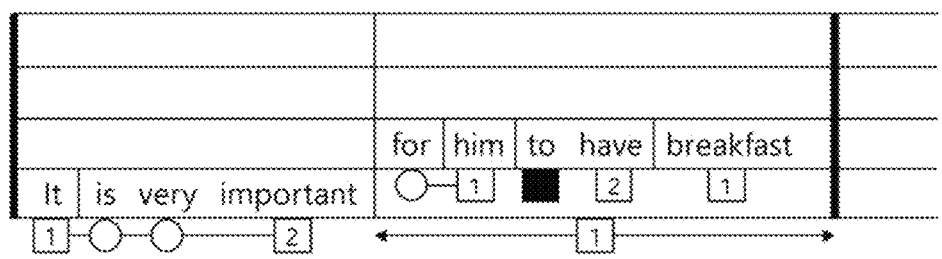
FIG. 32 illustrates a twenty first exemplary sentence.

For example, "for" is used to indicate a subject of an inserted sentence in FIG. 32, and thus, it may be indicated by a symbol "○."

When words composing the basic word order are put separately in a passive sentence including a sentence in a form of a changed verb, the words may be indicated by the same sentence level symbol.

Figure 33:
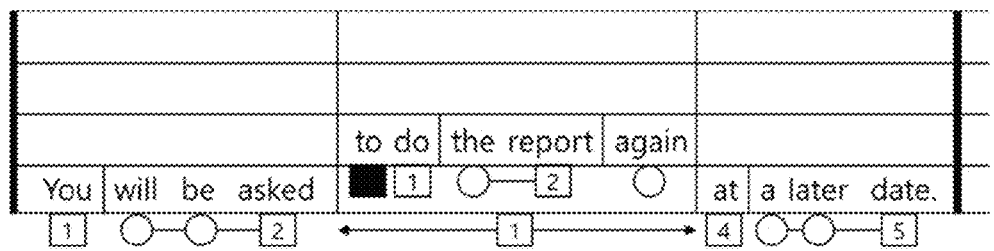
FIG. 33 illustrates a twenty second exemplary sentence.

As shown in FIG. 33, if a sentence including an inserted sentence is in the passive form, a subject of the inserted sentence may be regarded the same as a subject of the passive sentence and other words in the inserted sentence may be positioned after a past participle. Such an inserted sentence may be indicated by sentence segment symbols "▫" and "◂──────▫──────▸".

Figure 34:
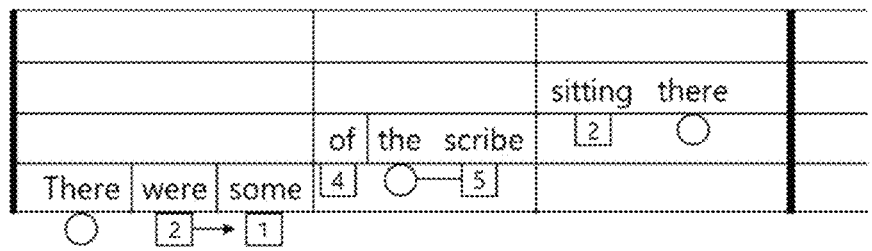
FIG. 34 illustrates a twenty third exemplary sentence.

As shown in FIG. 34, "verb+ing" in a sentence in a form of a changed verb is indicated by a sentence level symbol. Thus, "to" is indicated by a conjunction symbol "■" and "message" is indicated by a sentence level symbol "▣".

When being is omitted from a sentence in a form of a changed verb, a past particle in the form of "~ed" is indicated by a sentence level symbol. As shown in FIG. 35, "withered", which is a past particle that has been left after being was omitted, may be indicated by a sentence level symbol "▣".

If a coordinating conjunction, such as "and" and "or", is used, only the conjunction may be displayed at a different level while words or sentences in the equal structure, which are separated by the conjunction, may be displayed at the same level. In FIG. 36, "and" is at a level different from that of other sentences, and "baptizing" and "preaching" which are in the equal structure may be displayed at the same level.

Meanwhile, the principle of generation of a word order map, which is applied to the basic word order map or the basic expansion word order map, may be applicable within sentence expansion distinguishing lines.

If a subordinate clause starting with a conjunction comes first, the subordinate clause may be displayed at a height or in size different from a sentence in the basic word order. As shown in FIG. 37, a subordinate clause starting with "when" may be displayed at a level different from a sentence in the basic word order.

Figure 38:
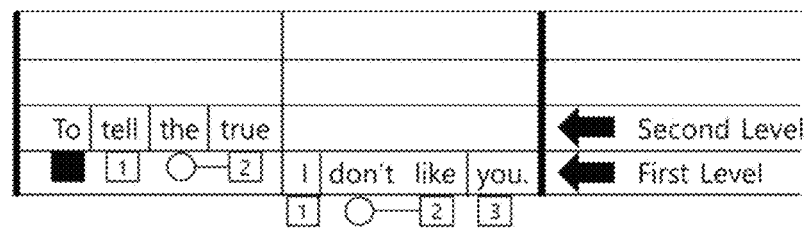
FIG. 38 illustrates a twenty seventh exemplary sentence.

When an adverbial infinitive comes at the beginning of a sentence, the adverb infinitive may be displayed at height or in size different from a sentence in the basic word order. As shown in FIG. 38, "to" may be indicated by a conjunctive symbol "■" and displayed at a different level.

Figure 39:
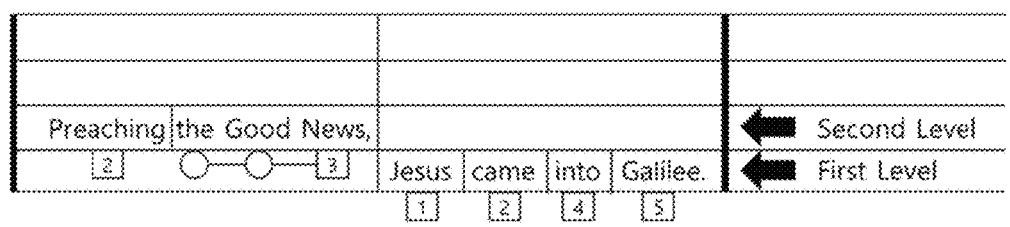
FIG. 39 illustrates a twenty eighth exemplary sentence.

Even when a particle clause comes at the beginning of a sentence, the particle clause may be displayed at height or in size different from a sentence in the basic word order. As shown in FIG. 39, a particle clause starting with "preaching" may be displayed at a different level.

Even when a participle clause is placed in the middle of a sentence, the participle clause may be displayed at height or in size different from a sentence in the basic word order.

Figure 40:
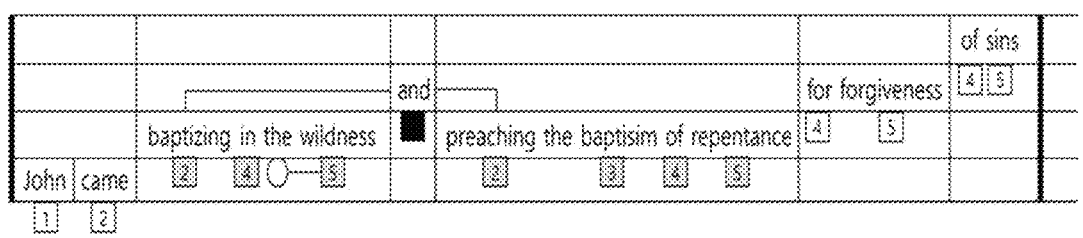
FIG. 40 illustrates a twenty ninth exemplary sentence.

As shown in FIG. 40, participle clauses starting with "baptizing" and "preaching", respectively, are placed in the middle of a sentence, and thus, they may be displayed at a different level.

When sentence segments are arranged in a different order in an inverted sentence, it is desirable to use an additional marker together with a sentence segment sequence symbol in order to show that the sentence is inverted.

Figure 41:
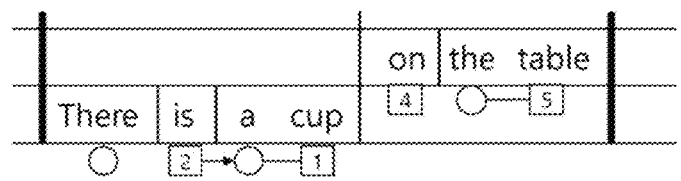
FIG. 41 illustrates a thirtieth exemplary sentence.

As shown in FIG. 41, a sentence segment sequence symbol and "-->" are used to indicate "is" so as to show that a sentence is inverted.

As described above, if an English word order map is made based on the above-described principles, it is possible to learn English systematically. Hereinafter, there is described a method of learning English, the method which is derived from the above-described principles.

The above-described English word order map may be provided in the form of image cards.

That is, a word order map may be in the form of double-sided cards which include images of all words which are able to compose an English sentence. Each card has two surfaces, as shown in FIG. 42.

Figure 42:
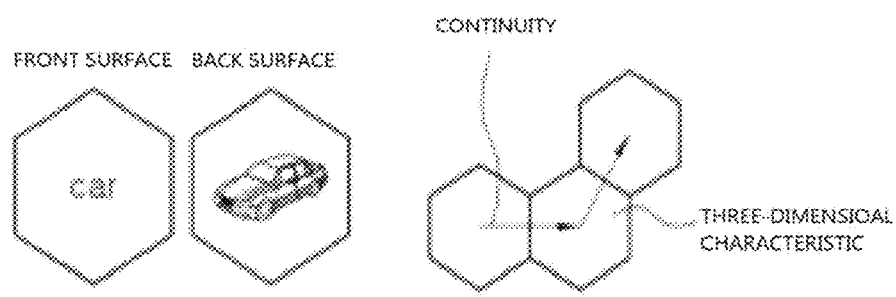
FIG. 42 illustrates a first example of word order map in the form of image card.

An image card is basically in a hexagon shape, as shown in FIG. 42, and continuity and three-dimensional characteristics may be achieved when a number of cards ae arranged consecutively.

The front surface of an image card has an English word, and the back surface thereof has an image associated with the English word. Each word of an English word order map is provided in the form of an image card, and multiple image cards are consecutively arranged in an order of the word order map.

Figure 43:
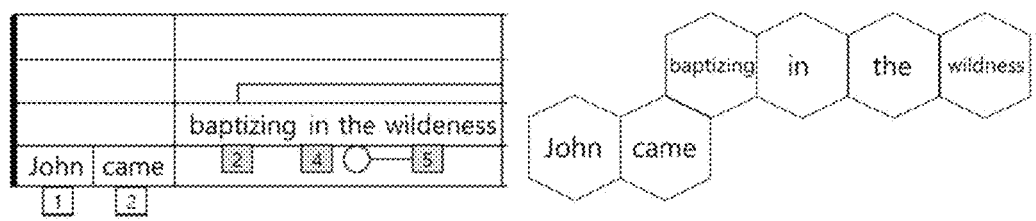
FIG. 43 illustrates a second example of word order map in the form of image card.
Figure 44:
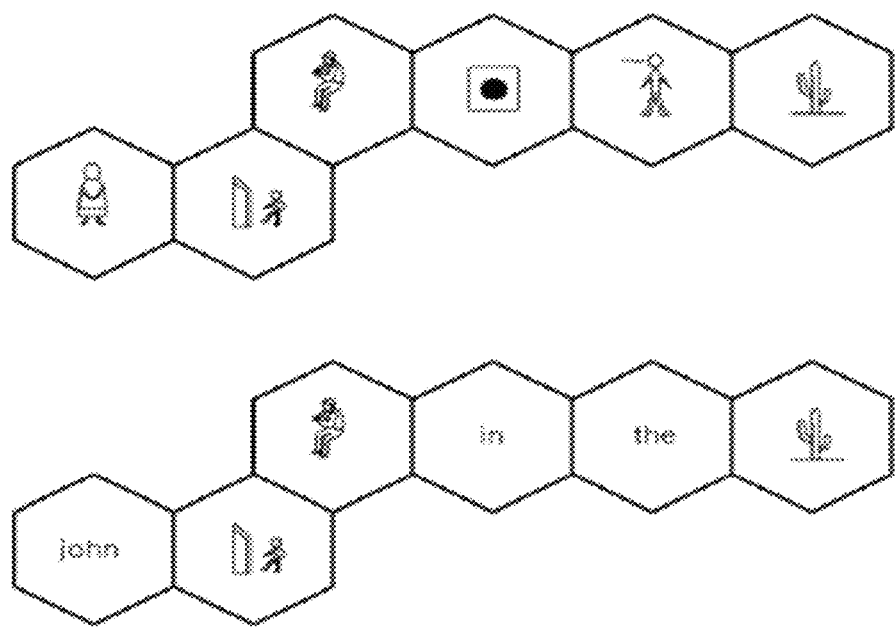
FIG. 44 illustrates a third example of word order map in the form of image card.

In addition, as shown in FIGS. 43 and 44, image cards may be aligned to arrange words, images, or a combination of words and images according to the word order map.

Navigator guide for an English sentence is similar to a service of a vehicle navigation system which provides necessary information at the current location to guide a route to a destination. When the navigator is located at a particular word of a sentence, the navigator provides various word order expansion principles which are available with reference to the particular word, and starts to guide word order expansion that is anticipated based on the so-far developed current word order.

The navigator guide about an English sentence is based on a logical system regarding English sentences, the system in which an English word order map has been adapted. The navigator guide basically provides a combination of the following: a sentence segment, a direction of modification, a sentence knot, a role of an auxiliary verb, a change of a part of speech, connection of two sentences, etc.

A sentence segment guide item provides guidance about the current sentence segment and anticipates a next sentence segment. At this point, whether the current sentence segment corresponds to a main situation or an auxiliary situation is guided.

When there is a sentence segment sequence symbol corresponding 1, 3, or 5, the fact that modification will be made later through sentence expansion, whether sentence expansion starts, and a new sentence segment level of sentence expansion are guided.

The guide as to a sentence knot is a guide of a sentence knot form (a conjunctive form, a verb-omitted form, or a verb-changed form) when sentence expansion is done.

When sentence expansion is made, a semantic subject of an expanded sentence is guided.

A modification and auxiliary relationship guide item provides guidance that, when a simple symbol comes first, a main word corresponding to a sentence segment sequence symbol is expected to appear.

When the simple symbol indicates an auxiliary verb, it is guided that a root verb follows, which does not have a meaning of an actual action, but a state of a thought or feeling.

When the simple symbol indicates have verb, it is guided that an adjective (past participle) follows and that a semantic meaning is to be interpreted by putting weight on the adjective.

If the simple symbol indicates be verb, it is guided that an adjective (past participle and present participle) follows. If a subject is a main agent of the action, it is guided that a current participle follows. If a subject is a target of the action, it is guided that a past participle follows.

If the sentence segment sequence symbol indicates a link verb or a sense verb, it is guided that an adjective follow.

If a current participle is a main word of a sentence segment, it is guided that a verb has turned into an adjective to emphasize movement attribute of an action and that a characteristic of the verb still remains. In addition, if a verbial noun is a main word of a sentence segment, it is guided that a verb has turned into a noun and that a characteristics of the verb still remains.

If "to +root verb" is a main word of a sentence segment, it is guided that a verb has turned into a noun, an adjective, or an adverb and that a characteristic of the verb still remains.

Meanwhile, if a conjunctive function word (and, or, etc.) comes, it is guided that two equal structures may come with reference to the conjunctive function word. A sentence starting with a past participle is one of sentence knots of a verb-changed form, and it is desirable to guide that an additional fact is present in a new sentence.

Adverbial infinitive is one of sentence knots in a verb-changed form. In this case, it is guided that an additional fact is present in a new sentence.

A method of learning English according to the present disclosure may be established by a system which utilizes an English word order map. Basically, a system is a hardware device including a sentence input unit for receiving a user's sentence, a control part for generating and storing content related to a word order map, and a display unit for displaying the content of the generated word order map.

The learning system using an English word order map may be defined as a system which generates an English word order map based on words necessary for composing a sentence and interaction between the words, and helps a leaner to accumulate experiences about sentences using the English word order map.

Such a system is used to determine which sentence segment a particular word selected from a sentence is positioned; anticipate a role of a word which is expected to appear next based on a role of the currently selected word; in response to appearance of an unexpected word, analyze the current situation, and figure out a word order expansion principle that is applied to the current situation.

To this end, the system may provide various learning methods to various learners. Depending on each learner's choice, the system may provide an English word order map generation module, a sentence reading module, a sentence learning module, and a sentence word order matching module.

The English word order map generation module generates content by applying the above-mentioned rule of marking an English word order map to a target English sentence. This is a basic function of the system according to the present disclosure.

Figure 4:
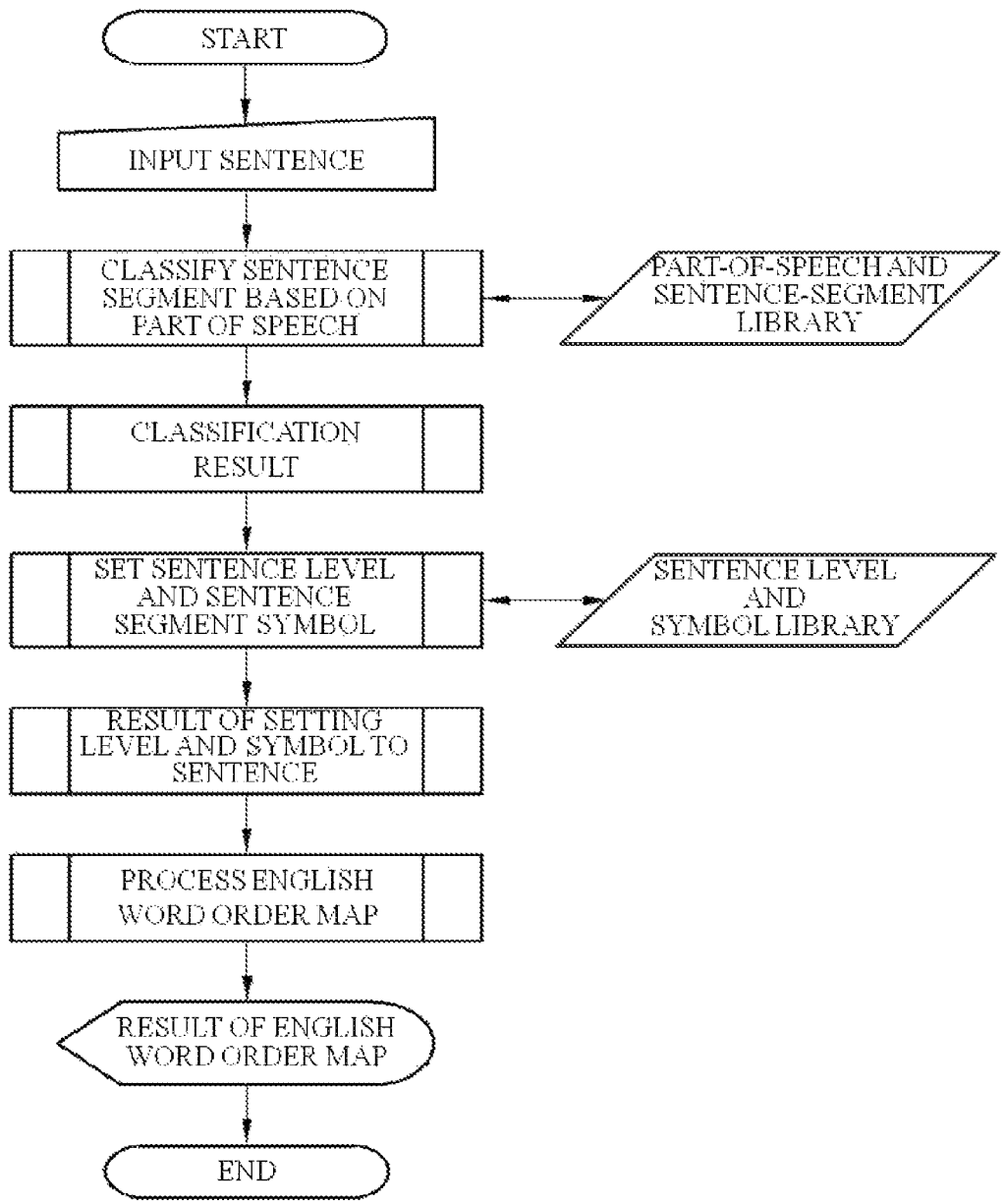
FIG. 4 is a diagram illustrating a procedure of generating an English word order map.

As illustrated in FIG. 4, a user inputs a sentence necessary to generate an English word order map.

Once the sentence is input, a predefined processing is performed in order to perform classification of sentence segments based on parts of speech, and the processing is performed with reference to a part-of-speech and sentence-segment library (data base).

The classification result is stored in an inner storage space, and a predefined processing related to a sentence level and a sentence segment symbol of the English word order map is performed based on the classification result.

The above process is also performed with reference to a sentence-level-and-symbol library (database), and the result thereof is also stored in the inner storage space.

Such results are used to display various types of English word order map content on a screen, and the whole process is terminated.

Figure 5:
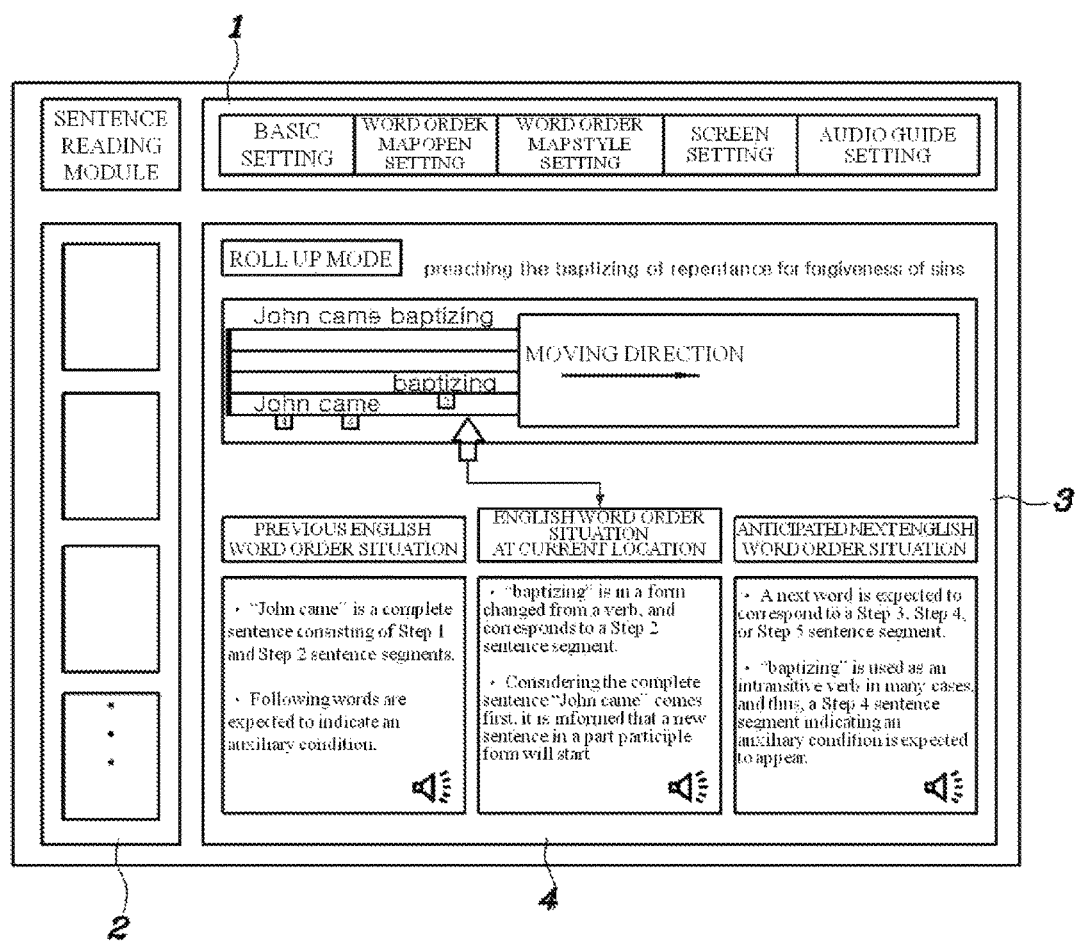
FIG. 5 is an example of a sentence reading module.

As illustrated in FIG. 5, environment which is most essential to operate the sentence reading module is related to a menu bar displayed on the top area of the screen.

On the left side of the screen, a menu in which English sentences content of to be learned are gathered may be displayed. On the upper middle area of the screen, a roll up mode which may enable a method of reading a hidden sentence each word ar once in a moving direction may be displayed.

Guide is provided by providing information on an appropriate order and grammar for each word in a sentence segment while expecting a role and a function of a following word, which is not shown yet. In this manner, it is possible to help a leaner to accumulate understanding and experiences about sentences.

A marker may be provided to indicate a current location among words displayed in the roll up mode. In addition, in the lower bottom area of the screen, there may be displayed an English word order situation guide region.

The English word order situation guide region provides a word order situation prior to a word displayed at the current location, a word order situation at the current location, and an anticipated next word order situation guide which is not yet shown.

Figure 6:
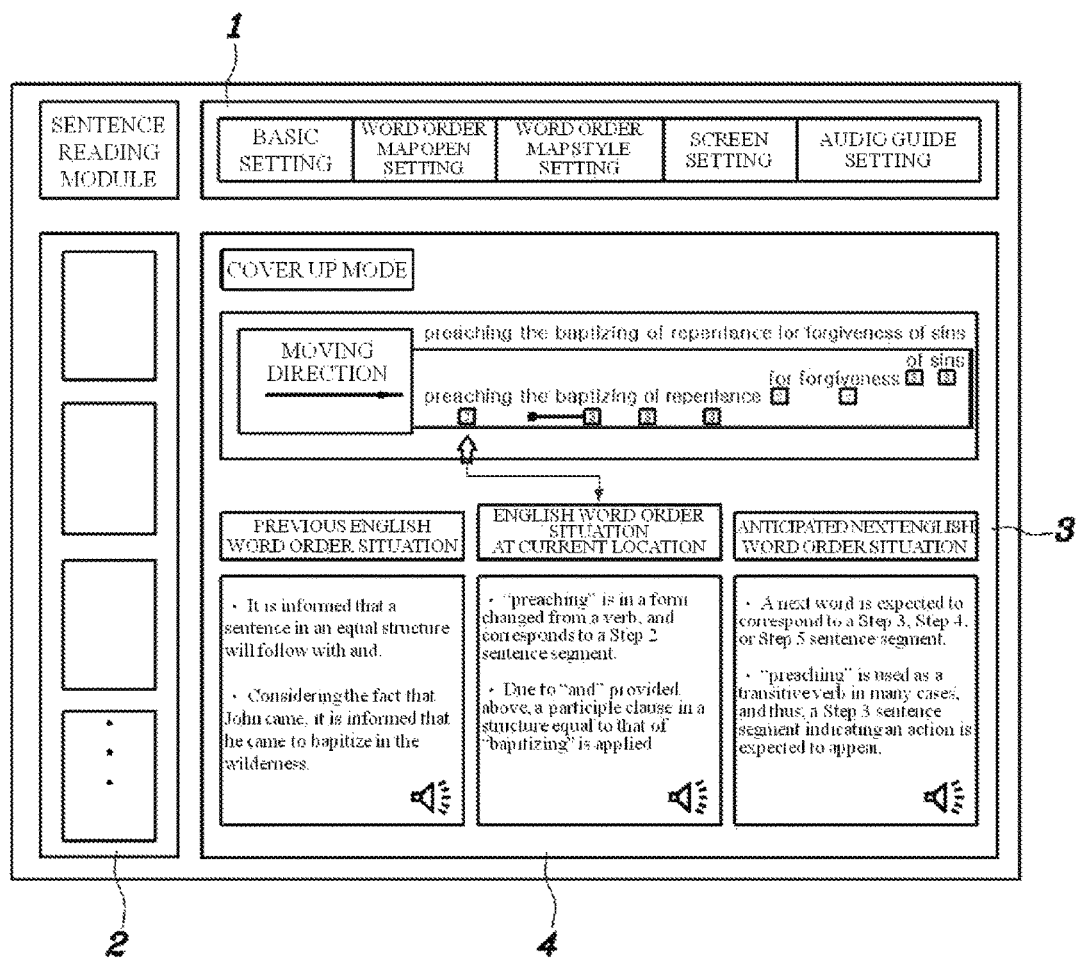
FIG. 6 is another example of a sentence reading module.

As shown in FIG. 6, the sentence reading module may provide a cover up mode.

The cover up mode is a learning method in which a full sentence is shown first and then each word is going to be hidden in a moving direction.

In this learning method not only provides information on a word order and grammar for each word in a sentence segment, but also guides roles and functions of next words based on hidden words. In this manner, it is possible to help a leaner to accumulate understanding and experiences about sentences.

A menu in whim a menu bar and English sentence content are gathered is the same as in the roll up mode. On the upper middle area of the screen, a screen for guiding a sentence based on a cover up function may be displayed. On the lower middle area of the screen, a screen for guiding an English word order situation based on provision of the cover up mode function may be displayed.

Figure 7:
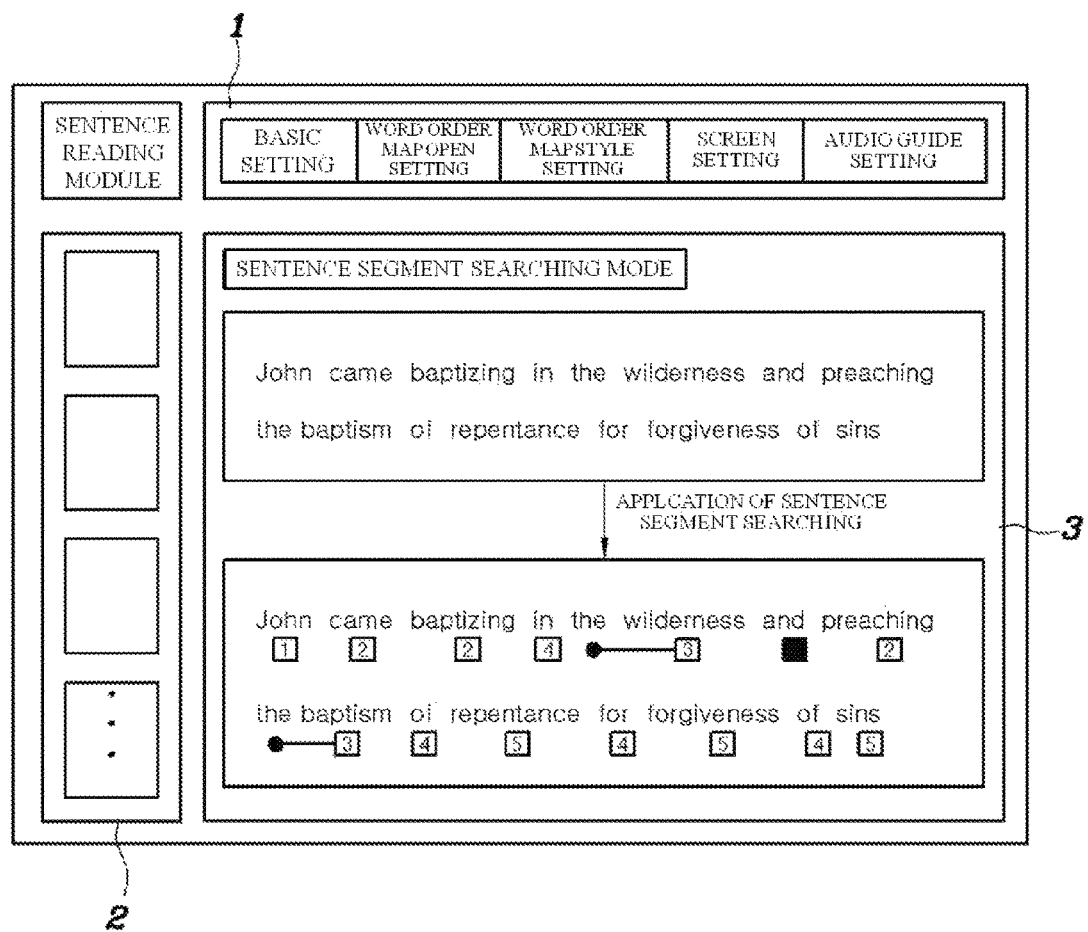
FIG. 7 is yet another example of a sentence reading module.

As illustrated in FIG. 7, the sentence reading module may provide a sentence segment searching mode.

The sentence segment searching mode is a reading mode in which sentence segments of a sentence, to which sentence levels has not yet to be set, necessary for making a word order map are displayed in a manner in which elements of the same sentence level are indicated by the same symbol and color.

A leaner is able to intuitively perceive corelationships between sentence segments of a planar sentence and words of the planar sentence.

On the top of the screen, there is displayed a menu bar for environment settings which is most essential to operate the sentence segment searching mode. On the left side, there is displayed a menu on which English sentence content desired by a leaner to learn are displayed.

On the upper middle area of the screen, there is displayed a window which shows a sentence selected by a learner in a planar structure and on which a result of the sentence segment searching mode is displayed upon application of the mode.

Figure 8:
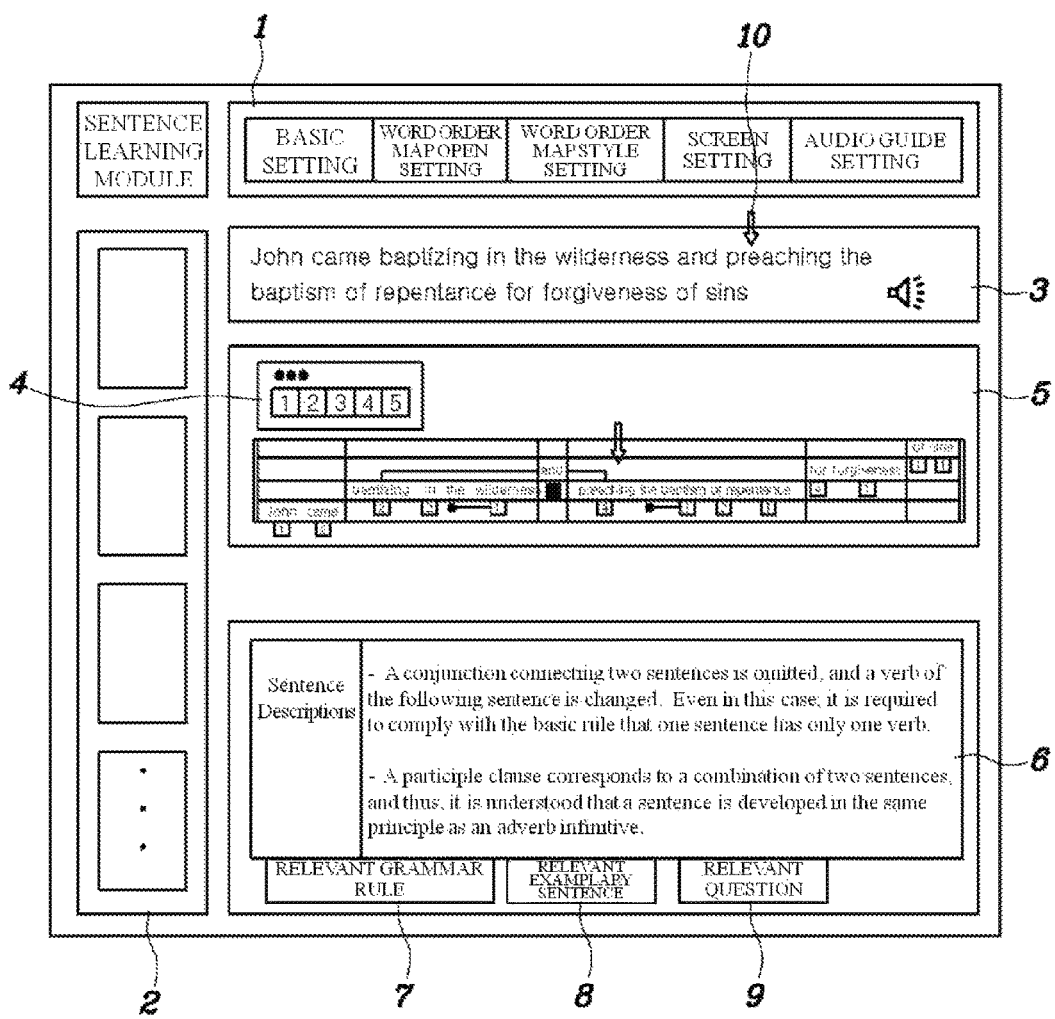
FIG. 8 is a diagram illustrating a sentence learning module.

FIG. 8 is a diagram illustrating the entire configuration of the sentence learning module.

On the top of the screen, there is displayed a menu bar for environment setting which is most essential to operate the sentence learning module. On the left side of the screen, there is displayed a menu bar on which English sentence content desired by a learner to learn are displayed.

A full sentence to be learned is displayed below the menu bar, and a window of an audio reading function as to the sentence is displayed.

If a leaner selects a location of a word to be learned, an arrow may be displayed on the screen to indicate the selected location. In addition, a window in which various grammatical explanations about the word are provided may be displayed.

Such a window provides a menu for a relevant grammar rule, a relevant example sentence, and a relevant question, and displays a menu item clicked by a user.

In addition, if a basic word order map and an expansion word order map are included on the screen, a navigator may be displayed to guide a sequence of a corresponding sentence and a location of a sentence segment in the sentence. In addition, the aforementioned English word order map of the sentence may be displayed.

Figure 9:
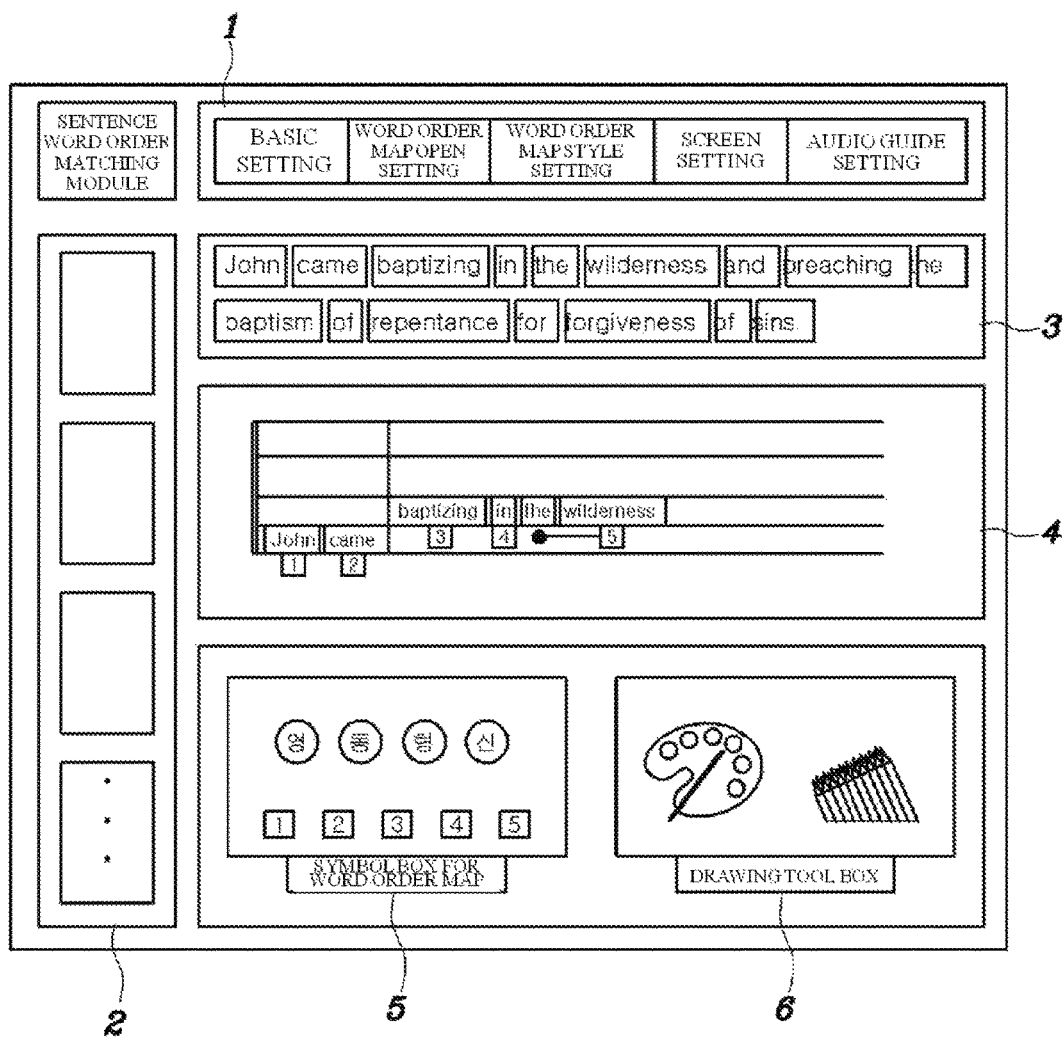
FIG. 9 is an example of a sentence word order matching module.

FIG. 9 is a diagram illustrating the sentence word order matching module.

On the top of the screen, there is displayed a menu bar for environment settings which is most essential to operate the sentence word order matching module.

On the left side of the screen, there is displayed a menu on which English sentence content desired by a leaner to learn are displayed.

Below a menu bar, there is displayed a window on which words of a sentence are separately distinguished to make a word order map of the sentence. Below the window, there is an additional window on which a leaner is able to make an English word order map using a given word. Below the additional window, there are provided symbols and drawing tools necessary for the leaner to make the English word order map.

Figure 10:
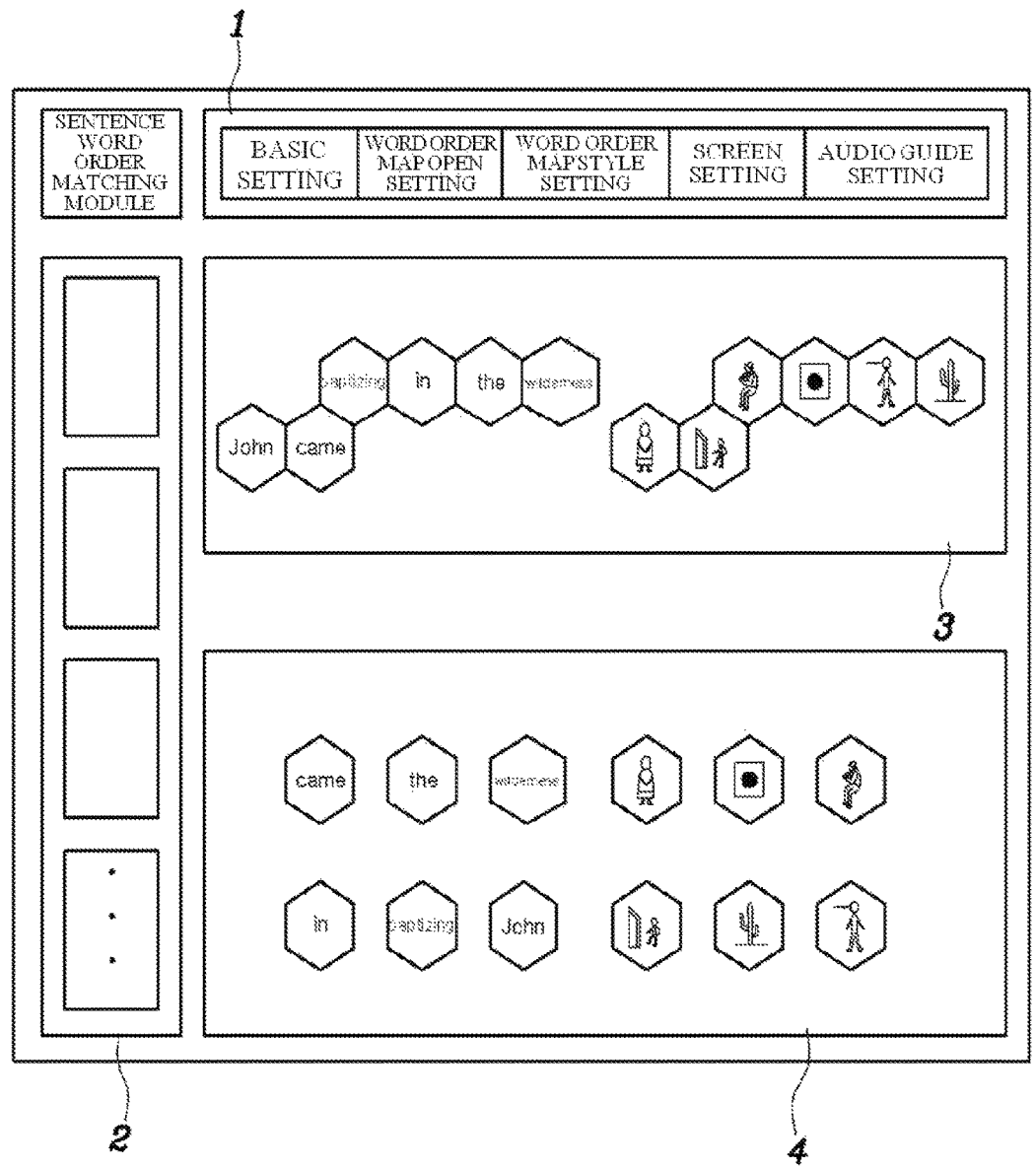
FIG. 10 is another example of a sentence word order matching module.

FIG. 10 is a diagram illustrating a method of matching a word order using image cards with a sentence word order matching module.

On the top of the screen, there is displayed a environment setting menu bar which is most essential to operate the sentence word order matching module.

On the left side of the screen, there is displayed a menu on which English sentence contents desired by a learner to learn are displayed.

Below the menu bar, three modes for matching a word order using image cards are supported: the three modes include a word arrangement mode, an image arrangement mode, and a mix arrangement mode. The cards necessary for arrangement of the image cards are randomly arranged, and a learner may select and move the cards for sentence word order matching.

A system for learning English using an English word order map according to the present disclosure has adapted the aforementioned basic rules and principles, and the aforementioned functions may be provided by a storage medium, such as a portable terminal and a computer.

Regardless of a type of the storage medium, the system for learning English using an English word order map according to the present disclosure includes a sentence input unit, a sentence division unit, a symbol determination unit, and an English word order map generation unit. The descriptions about the basic rules and principles are the same as provided above, so basic means implementing the above functions are described briefly.

The sentence input unit corresponds to an interface which senses a sentence input by a learner.

The sentence division unit divides the sentence input through the sentence input unit into a main event, which includes a main agent, an action, and a target, and an auxiliary situation which includes an auxiliary condition and a criterion thereof. In the sentence, a part about the main agent is classified as the Step 1 sentence segment; a part about the action is classified as the Step 2 sentence segment; a part about the target is classified as the Step 3 sentence segment; a part about the auxiliary condition is classified as the Step 4 sentence segment; and a part about the criterion of the auxiliary condition is classified as the Step 5 sentence segment; and an object of question, a question word, or an object of exclamation is classified as the Step 0 sentence segment, wherein the object of question corresponds to existence, behavior, thought, experience, and 5W1H in an interrogative sentence, wherein the classification is performed to enable each word in the Step 0 to Step 5 sentence segments to conform to a part of speech that is set to a corresponding sentence segment.

The symbol determination unit determines a classification indicator and a modification relationship indicator for each word included in the Step 0 to Step 5 sentence segments.

The English word order map generation unit generates an English word order map by assigning a symbol determined by the symbol determination unit to a word included in the Step 0 to Step 5 sentence segments.

The symbol determiner stores: a sentence segment distinguishing line for distinguish the Step 0 to Step 5 sentence segments separately; a sentence step distinguishing line for display a basic sentence and an expansion sentence at different height wherein one sentence includes the basic sentence and the expansion sentence; a sentence distinguishing line for displaying the sentence, which includes the basic sentence and the expansion sentence, as one unit; a sequence symbol for indicating a sentence segment which is composed by a word included in the sentence; a simple symbol for indicating that a word is a word other than a main word; a modification relationship line for indicating a relationship between the simple symbol and the sequence symbol, and a navigator for indicating a location of a word included in the sentence.

It is desirable to further include a module generation unit which changes an English word order map generated by the English word order map generation unit based on a leaner's study method and stores the changed map. The module generation unit may generate and store a sentence reading module.

The sentence reading module includes: a content storage unit for storing English sentence content to be learned on the basis of content item unit; an English word order situation guide unit for guiding a word order situation of an English word selected by a learner from an English word order map; an English word order map storage unit for receiving data from the English word order map generation unit and storing the received data; and a menu bar. The English word order situation guide unit may provide an English word order situation prior to a word at the current location, an English word order situation at the current location, and an anticipated next English word order situation. The English word order situation guide unit may desirably further include a display unit, which display the menu bar and displays, on an additional window, content stored in the content storage unit, the English word order situation guide unit, and the English word order map storage unit.

In addition, the sentence reading module further includes a mode conversion unit which receives the English word order map from the English word order map storage unit, and converts into one of a roll up mode, a cover up mode, and a sentence segment searching mode. The roll up mode may be implemented to enable a leaner to sequentially open each word at once from a hidden English word order map. The cover up mode may be implemented to enable a learner to sequentially hide each word at once from a full open sentence. The sentence segment searching mode may be implemented such that sentence segments of a sentence, to which sentence levels have not yet to be set, necessary for the English word order map are displayed differently according to sentence levels.

The module generation unit may generate and store a sentence learning module.

The sentence learning module includes a content storage unit for storing English sentence content to be learned on the basis of content item unit; a content implementation unit for storing a sentence desired by a learner to learn and audio sound of the sentence an English word order map storage unit for receiving data from the English word order map generation unit and storing the received data; an English word order grammar guide unit for guiding grammar of an English word selected by the leaner from the English word order map; and a menu bar. The English word order grammar guide unit may provide explanation about a relevant grammar rule, a relevant sentence, and a relevant question. The English word order grammar guide unit further includes a display unit, which displays a menu bar and displays, on an additional window, content stored in the content storage unit, the content implementation unit, the English word order map storage unit, and the English word order grammar guide unit.

Meanwhile, the module generation unit may generate and store a sentence word order matching module.

The sentence word order matching module includes: a content storage unit for storing English sentence content to be learned on the basis of content item unit; a word storage unit for storing words necessary for a learner to make a word order map of a corresponding sentence; a symbol determiner for receiving a symbol from the symbol determination unit and storing the symbol, and a menu bar. The sentence word order matching module may further include a display unit, which displays the menu bar and display, on an additional window, content stored in the content storage unit, the word storage unit, and the symbol storage unit. On the display unit, an additional may be displayed to enable a learner to make an English word order map using symbols stored in the symbol storage unit.

The module generation unit may generate and store a sentence word order matching module.

The sentence word order matching module includes a content storage unit for storing English sentence content to be learned on the basis of content item unit; an image card storage unit for storing a card, on both sources of which a spelling and an image of a word included in an English sentence selected by a leaner are displayed; and a menu bar. The sentence word order matching module may further include a display unit, which displays the menu bar and displays, on an additional window, content stored in the content storage unit, the menu bar, and the image card storage unit. On the display unit, an additional window may be displayed to enable a leaner to make an English word order map using image cards stored in the image card storage unit.

The image cards are sequentially arranged and desirably in a hexagon shape so that a word, which has a sentence level different from that of an adjacent word, is placed at different height and connected to the adjacent word.

The present disclosure is described with particular exemplary cases. However, it should be understood that numerous other modifications and embodiments can be devised by those skilled in the art that will fall within the spirit and scope of the principles of this disclosure.

The invention claimed is:

1. A method of learning English using an English word order map, comprising:
    dividing a sentence input by a learner into a main event and an auxiliary situation, wherein the main event includes a main agent, an action, and an object, and the auxiliary situation includes an auxiliary condition and a criterion therefor,
    wherein a part representing the main agent is classified as a Step 1 sentence segment, a part representing the action is classified as a Step 2 sentence segment, a part representing the object is classified as a Step 3 sentence segment, a part representing the auxiliary condition is classified as a Step 4 sentence segment; and a part representing the criterion of the auxiliary condition is classified as a Step 5 sentence segment, and
    wherein a word composing each of the Step 1 to Step 5 sentence segments conforms to a part of speech that is set to each of the Step 1 to Step 5 sentence segments.

2. The method of claim 1, wherein an object of question in an interrogative sentence, and an exclamatory word and an object of exclamation in an exclamatory sentence are positioned in a Step 0 sentence segment, wherein the object of question corresponds to existence, behavior, thought, experience, and 5W1H.

3. The method of claim 2,
    wherein the Step 1 to Step 5 sentence segments are distinguished in the sentence by sentence segment distinguishing lines,
    wherein a basic sentence and an expansion sentence are displayed at different height when the sentence is expanded,
    wherein the expansion sentence is distinguished by a sentence expansion distinguishing line,
    wherein one sentence including the basic sentence and the expansion sentence is displayed as one unit by a sentence distinguishing line,
    wherein a sentence segment sequence symbol is displayed at a location of a main word of a sentence segment to indicate a sequence of the sentence segment,
    wherein a word other than the main word is indicated by a simple symbol,
    wherein a relationship between the symbol symbol and the sentence segment sequence symbol is indicated by a modification relationship symbol, and
    wherein a location of a particular word is indicated by a navigator.

4. The method of claim 3,
    wherein words sequentially arranged in the sentence are displayed by sequentially connecting image cards,
    wherein a word included in the sentence is shown on a front surface of an image card, and a meaning of the word is shown on a back surface thereof, and
    wherein a word having a different sentence level is placed at different height.

5. The method of claim 4,
    wherein the navigator provides a guide about a current sentence segment of a current step, anticipate a next sentence segment, provide a guide as to whether a current sentence segment corresponds to a main situation or an auxiliary situation in a sentence, and provide guidance that a modifying sentence is able to follow each of the Step 1 sentence segment, the Step 2 sentence segment, and the Step 5 sentence segment, and
    wherein the navigator comprises:
        a sentence segment guide item configured to notify whether sentence expansion has started, and then provide a guide to a new sentence segment step when the sentence expansion is done;
        a sentence knot guide item configured to, upon the sentence expansion, display front and back sentences in a connected form and indicate a semantic subject of an expansion sentence;
        a modification and auxiliary relationship guide item configured to, in response to appearance of a simple symbol, anticipate that a main word corresponding to a sentence segment sequence symbol follows;
        a part-of-speech change guide item configured to, in response to change of a part of speech with respect to a main word of a sentence segment, guide a meaning of the main word; and
        a sentence connection guide item configured to, in response to connection of two or more words or sentences, guide a meaning of the connection.

6. The method of claim 2, wherein the part of speech conforming to the Step 0 to Step 5 sentence segments is in compliance with the following rules:
    i) a declarative sentence: a Step 1 sentence segment (noun), a Step 2 sentence segment (verb, verb+adjective), a Step 3 sentence segment (noun, noun+noun) a Step 4 sentence segment (preposition), and a Step 5 sentence segment (noun);
    ii) an imperative sentence: a Step 1 sentence segment (noun), a Step 2 sentence segment (verb, verb+adjective), a Step 3 sentence segment (noun, noun+noun), a Step 4 sentence segment (preposition), and a Step 5 sentence segment (noun);
    iii) an interrogative sentence: a Step 0 sentence segment (question word, auxiliary verb), a Step 1 sentence segment (noun), a Step 2 sentence segment (verb, verb+adjective), a Step 3 sentence segment (noun, noun+noun), a Step 4 sentence segment (preposition), and a Step 5 sentence segment (noun), and iv) an exclamatory sentence: a Step 0 sentence segment (exclamatory word+a/an+adjective, noun or exclamatory word+adjective/adverb), a Step 1 sentence segment (noun), and a Step 2 sentence segment (verb, verb+adjective).

7. The method of claim 6, wherein the Step 1 to Step 5 sentence segments are expanded in a manner in which a word or sentence modifying a main word is further displayed in each sentence segment, wherein nouns included in the Step 1, Step 3, and Step 5 sentence segments, a verb included in the Step 2 sentence segment, and a preposition included in the Step 4 sentence segment are used as a main word.

8. The method of claim 7,
wherein, when a noun is a main word, a sentence segment is expanded in compliance with one of the following rules: i) a determiner/adjective/noun+a noun (main word), ii) a noun (main word)+a modifying sentence, and iii) a full sentence inserted into a position of a noun (main word);
wherein the modifying sentence in the rule ii) is in a form of a conjunctive function word+a modifying sentence, a verb-omitted sentence (preposition+noun, adjective), and or a verbial adjective (to+verb, verb+ing, verb+~ed), and
wherein a sentence inserted under the rule iii) is in a fort of a conjunction+a sentence, a question word+to verb, or a verbial noun (to+verb, verb+ing).

9. The method of claim 7, wherein, when a verb is a main word, a sentence segment is expanded in compliance with one of the following rules: i) an auxiliary verb (a helping verb)+a verb, ii) an auxiliary verb (have, be)+a verbial adjective (a current participle, a past participle), and iii) a link/sense verb+an adjective.

10. A system for learning English using an English word order map, the system comprising:
a sentence input unit configured to act as an interface to receive a sentence from a user,
a sentence classifier provided in a control part and configured to:
divide the sentence input to the sentence input unit into a main event, which includes a main agent, an action, and a target, and an auxiliary situation which includes an auxiliary condition and a criterion of the auxiliary condition, and
classify a part representing the main agent as a Step 1 sentence segment; classify a part representing the action as a Step 2 sentence segment, a part representing the target as a Step 3 sentence segment, classify a part representing the auxiliary condition as a Step 4 sentence segment, classify the criterion of the auxiliary condition as a Step 5 sentence segment, and classify an object of question in an interrogative sentence and an exclamatory word and an object of exclamation as a Step 0 sentence segment, wherein the object of question corresponds to existence, behavior, thought, experience, or 5W1H, and wherein the classification is performed in consideration of a part of speech set to each of the sentence segments;
a symbol determination unit provided in the control part and configured to determine a classification indicator and a modification relation indicator for a word included in each of the Step 0 to Step 5 sentence segment; and
an English word order map generator provided in the control part and configured to generate an English word order map by assigning a symbol determined by the symbol determination unit to a word included in each of the Step 0 to Step 5 sentence segments.

11. The system of claim 10, wherein the symbol determination unit is configured to store:
a sentence segment distinguishing lines configured to distinguish each of the Step 0 to Step 5 sentences segments;
a sentence level distinguishing line configured to display a basic sentence and an expansion sentence at different height, wherein the basic sentence and the expansion sentence modifying the basic sentence are included in one sentence;
a sequence symbol configured to indicate that a word included in a sentence is a word composing any one of the Step 0 to Step 5 sentence segments;
a simple symbol configured to indicate a word other than the main word;
a modification relation line configured to indicate a relationship between the simple symbol and the sequence symbol; and
a manigator configured to indicate a location of a word included in a sentence.

12. The system of claim 11, further comprising a module generation unit which is provided in the control part and configured to change the English word order map, generated by the English word order map generation unit, according to a learner's study method, and store the changed English word order map.

13. The system of claim 12,
wherein the module generation unit is configured to generate and store a sentence reading module,
wherein the sentence reading module comprises:
a content storage unit configured to store English sentence content to be learn on the basis of a content item unit;
an English word order situation guide unit configured to provide a word order situation of a word selected by a learner from the English word order map;
an English word order storage unit configured to receive data from the English word order map generation unit and store the received data; and
and a menu bar,
wherein the English word order situation guide unit provides a word order situation prior to a word displayed at a current location, a word order situation at the current location, and an anticipated next word order situation, and
wherein the English word order situation guide unit further includes a display unit configured to display the menu bar and display, on an additional window, content stored in the content storage unit, the English word order situation guide unit, and the English word order map storage unit.

14. The system of claim 13,
wherein the sentence reading module further comprises a mode conversion unit which receives the English word order map from the English word order map storage unit, and converts the received English word order map into a roll up mode, a cover up mode, and a sentence segment searching mode, wherein the roll up mode is implemented to enable a leaner to sequentially open each word at once from a hidden English word order map, wherein the cover up mode is implemented to enable the learner to sequentially hide each word at once from an open English word order map, and wherein the sentence segment searching mode is implemented such that sentence segments of a sentence, to which sentence levels have not yet to be set, necessary for the English word order map are displayed differently according to sentence levels.

15. The system of claim 12, wherein the module generation unit is configured to generate and store a sentence learning module, wherein the sentence learning module comprises:
- a content storage configured to store English sentence content to be learned on the basis of a content item unit;
- a content implementation unit configured to store a sentence desired by a learner to learn and audio sound of the sentence;
- an English word order map storage configured to receive data from the English word order map generator and store the received data;
- an English word order grammar guide unit configured to guide a grammatical situation of an English word selected by the learner from the English word order map; and
- a menu bar, wherein the English word order grammar guide unit provides descriptions about a relevant grammar rule, a relevant exemplary sentence, and a relevant question, and wherein the English word order grammar guide unit further comprises a display unit configured to display the menu bar and display, on an additional window, content stored in the content storage unit, the content implementation unit, the English word order map storage unit, and the English word order grammar guide unit.

16. The system of claim 12, wherein the module generation unit is configured to generate a sentence word order matching module, wherein the sentence word order matching module comprises:
- a content storage unit configured to store English sentence content to be learn on the basis of a content item unit;
- a word storage unit configured to store words necessary for a learner to make a word order map of a sentence;
- a symbol storage unit configured to receive a symbol from the symbol determiner and store the received symbol; and
- a menu bar, wherein the sentence word order matching module further comprises a display unit configured to display the menu bar and display, on an additional window, content stored in the content storage unit, the word storage unit, and the symbol storage unit, and wherein an additional window is displayed on the display unit to enable the learner to make an English word order map using symbols stored in the symbol storage unit.

17. The system of claim 12, wherein the module generation unit is configured to generate and store a sentence word order matching module, wherein the sentence word order matching module comprises:
- a content storage unit configured to store English sentence content to be learn on the basis of a content item unit;
- a card storage unit configured to store an image card, on front and back surfaces of which a spelling and an image of a word selected by a learner from the English sentence content are displayed respectively; and
- a menu bar, wherein the sentence word order matching module further comprises a display unit configured to display the menu bar and display, on an additional window, content stored in the content storage unit, the menu bar, and the image card storage unit, and wherein an additional window is displayed on the display unit to enable the learner to make the English word order map using image cards stored in the image card storage unit.

18. The system of claim 17, wherein the image cards are arranged sequentially in a hexagon shape so that a word having a sentence level different from a sentence level of an adjacent word is placed at different height and connected to the adjacent word.

* * * * *